United States Patent
Yu

(10) Patent No.: US 10,931,579 B2
(45) Date of Patent: Feb. 23, 2021

(54) ROUTE SEARCH METHOD AND APPARATUS, AND ROUTING DEVICE

(71) Applicant: Huawei Technologies Co., Ltd., Guangdong (CN)

(72) Inventor: Jingzhou Yu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 2 days.

(21) Appl. No.: 16/226,395

(22) Filed: Dec. 19, 2018

(65) Prior Publication Data

US 2019/0124002 A1     Apr. 25, 2019

Related U.S. Application Data

(63) Continuation of application No. PCT/CN2017/076932, filed on Mar. 16, 2017.

(30) Foreign Application Priority Data

Jun. 24, 2016   (CN) .......................... 2016 1 0465895

(51) Int. Cl.
*H04L 12/741* (2013.01)
*H04L 12/751* (2013.01)
(Continued)

(52) U.S. Cl.
CPC .............. *H04L 45/74* (2013.01); *H04L 45/02* (2013.01); *H04L 45/127* (2013.01); *H04L 45/54* (2013.01); *H04L 61/2517* (2013.01); *H04L 69/22* (2013.01)

(58) Field of Classification Search
CPC ....... H04L 45/74; H04L 45/02; H04L 45/127; H04L 45/54; H04L 61/2517; H04L 69/22
See application file for complete search history.

(56) References Cited

U.S. PATENT DOCUMENTS 7,035,925 B1 * 4/2006 Nareddy ................. H04L 67/22
                                                     709/224
7,117,193 B1 * 10/2006 Basko .................... G06Q 30/02
(Continued)

FOREIGN PATENT DOCUMENTS

| CN | 101296186 A | 10/2008 |
| CN | 102413184 A | 4/2012 |

(Continued)

OTHER PUBLICATIONS

Chen Wen-Long et al, "Decomposed Storage Model of FIB for Cluster Router", Chinese Journal of Computers, vol. 34, No. 9, Sep. 30, 2011, 17 pages.

*Primary Examiner* — Jenee Holland
(74) *Attorney, Agent, or Firm* — Womble Bond Dickinson (US) LLP

(57) ABSTRACT

Embodiments of the present disclosure disclose a route search method and apparatus, and a routing device. The method includes: obtaining a keyword; obtaining node data based on a pre-obtained storage address of the node data; determining, in the node data, data corresponding to the keyword; when the data is a storage address of next-level node data and a storage location of the next-level node data, obtaining a storage location of the node data; when the storage location of the node data is different from the storage location of the next-level node data, adding a search identifier, the storage address of the next-level node data, and a remaining part of the keyword to a frame header of a packet; and sending the packet having the frame header to a specified board corresponding to the storage location of the next-level node data.

15 Claims, 18 Drawing Sheets

(51) Int. Cl.
*H04L 12/721* (2013.01)
*H04L 29/06* (2006.01)
*H04L 29/12* (2006.01)

(56) References Cited

U.S. PATENT DOCUMENTS

| | | | |
|---|---|---|---|
| 7,826,369 B2 | 11/2010 | Filsfils et al. | |
| 2002/0147793 A1* | 10/2002 | Ooishi | G06F 16/3334 |
| | | | 709/219 |
| 2007/0255795 A1* | 11/2007 | Wang | G06Q 10/107 |
| | | | 709/207 |
| 2008/0005342 A1* | 1/2008 | Schneider | H04L 61/3015 |
| | | | 709/230 |
| 2009/0006351 A1* | 1/2009 | Stephenson | G06F 16/958 |
| 2010/0080233 A1 | 4/2010 | Kwapniewski et al. | |
| 2010/0332592 A1* | 12/2010 | Hamada | H04L 61/303 |
| | | | 709/203 |
| 2011/0225207 A1 | 9/2011 | Subramanian et al. | |
| 2013/0067115 A1* | 3/2013 | Lapanc | H04L 61/106 |
| | | | 709/245 |
| 2014/0143779 A1* | 5/2014 | Marchione | H04L 51/14 |
| | | | 718/100 |
| 2016/0112329 A1* | 4/2016 | Ding | H04L 47/2441 |
| | | | 370/235 |
| 2018/0019943 A1 | 1/2018 | Gobriel et al. | |

FOREIGN PATENT DOCUMENTS

| | | |
|---|---|---|
| CN | 102594699 A | 7/2012 |
| CN | 102857414 A | 1/2013 |
| CN | 105049359 A | 11/2015 |
| CN | 105227468 A | 1/2016 |

* cited by examiner

ROUTE SEARCH METHOD AND APPARATUS, AND ROUTING DEVICE

CROSS-REFERENCE TO RELATED APPLICATIONS

This application is a continuation of International Application No. PCT/CN2017/076932 filed on Mar. 16, 2017, which claims priority to Chinese Patent Application No. 201610465895.5 filed on Jun. 24, 2016, and the disclosures of the aforementioned applications are hereby incorporated by reference in their entireties.

TECHNICAL FIELD

The present application relates to the field of communications technologies, and more specifically, to a route search method and apparatus, and a routing device.

BACKGROUND

FIG. 1 shows a router architecture used relatively widely currently. The router architecture mainly includes components such as an uplink line card 1, a switching board 2, and a downlink line card 3. In the router architecture shown in FIG. 1, a packet is first processed by a network processor and a traffic manager of the uplink line card 1, is sent to the downlink line card 3 by using the switching board 2, and is sent after being processed by a traffic manager and a network processor of the downlink line card 3.

The following briefly describes an IPv4 (Internet Protocol version 4) packet forwarding procedure. First, the network processor of the uplink line card 1 performs a series of preprocessing on a packet after the packet is received. Then, for an IP address of the packet, a search engine of the uplink line card 1 searches a memory for a routing and forwarding table in an LPM (longest prefix match) manner, to find a longest match routing entry and obtain outbound port information. Then, the traffic manager of the uplink line card 1 sends the packet to the switching board 2, and the switching board 2 switches the packet to the downlink line card 3 of an outbound port. Finally, the traffic manager and the network processor of the downlink line card 3 process the packet, and the packet is sent through the outbound port of the downlink line card 3.

A forwarding information table has a relative large quantity of entries, and requires relatively large storage space. However, storage space of the uplink line card is quite limited, and usually an additional memory needs to be added to the uplink line card, so that the memory stores all the entries of the forwarding information table. Therefore, the search engine of the uplink line card often needs to obtain, from the memory, content of the forwarding information table.

In a research and practice process, the inventor finds that the prior art has at least the following problems: In the prior art, not only an additional memory needs to be connected to the uplink line card, but also a connection line needs to be established between the search engine of the uplink line card and the memory to maintain communication. Consequently, hardware costs are increased.

SUMMARY

Embodiments of the present disclosure provide a route search method and apparatus, and a routing device, to resolve a technical problem of high hardware costs in related solutions.

To resolve the foregoing technical problem, the embodiments of the present disclosure disclose the following technical solutions.

According to a first aspect, a route search method is provided. The method is applied to a target board of a routing device, and the method includes:

obtaining a keyword, where the keyword is obtained by translating an IP address in a packet;

obtaining node data based on a pre-obtained storage address of the node data, where the node data is a correspondence among a prefix, outbound port information of a target prefix, a storage address of next-level node data, and a storage location of the next-level node data;

determining, in the node data, a prefix matching a first part of the keyword, and determining, in the node data, data corresponding to the prefix, where the keyword includes the first part and a second part;

when the data is the storage address of the next-level node data and the storage location of the next-level node data, obtaining a storage location of the node data;

when the storage location of the node data is different from the storage location of the next-level node data, adding a pre-generated search identifier, the storage address of the next-level node data, and the second part of the keyword to a frame header of the packet, where the search identifier is used to indicate that the packet is a packet that needs to be used for subsequent search; and sending the packet having the frame header to a specified board corresponding to the storage location of the next-level node data.

With reference to the first aspect, in a first possible implementation, after the step of obtaining a storage location of the node data, the method further includes:

determining whether the storage location of the node data is the same as the storage location of the next-level node data; and when the storage location of the node data is the same as the storage location of the next-level node data, obtaining the next-level node data based on the storage address of the next-level node data; determining, in the next-level node data, data corresponding to the second part of the keyword; and when the data is the outbound port information of the target prefix, sending the packet to a location corresponding to the outbound port information; or when the storage location of the node data is different from the storage location of the next-level node data, performing the step of adding a search identifier, the storage address of the next-level node data, and the second part of the keyword to a frame header of the packet.

With reference to the first aspect, in a second possible implementation, after the step of determining, in the node data, a prefix matching the keyword, and determining, in the node data, data corresponding to the prefix, the method further includes:

determining whether the data is the storage address of the next-level node data and the storage location of the next-level node data; and when the data is the storage address of the next-level node data and the storage location of the next-level node data, performing the step of obtaining a storage location of the node data; or when the data is not the storage address of the next-level node data and the storage location of the next-level node data, determining whether the data is the outbound port information of the target prefix; and when the data is the outbound port information of the target prefix, sending the packet to a location corresponding to the outbound port information.

With reference to the first aspect, in a third possible implementation, before the step of obtaining a keyword, the method further includes:

obtaining each preset target prefix and outbound port information of each target prefix;

creating a plurality pieces of node data based on each target prefix and the outbound port information of each target prefix, where the plurality pieces of node data are classified into at least two levels, and the node data has at least one prefix;

determining a storage location of each of the plurality pieces of node data, a storage location of next-level node data of each piece of node data, and a storage address of the next-level node data of each piece of node data;

adding the storage location of the next-level node data of each piece of node data and the storage address of the next-level node data of each piece of node data to the plurality pieces of node data; and storing the plurality pieces of node data in the storage location corresponding to each piece of node data.

With reference to the first aspect, the first possible implementation of the first aspect, the second possible implementation of the first aspect, or the third possible implementation of the first aspect, in a fourth possible implementation, before the step of obtaining node data based on a pre-obtained storage address of the node data, the method further includes:

allocating each piece of node data to each storage location according to a preset allocation policy, where each storage location is selected from a plurality of boards of the routing device.

According to a second aspect, a route search method is provided. The method is applied to a specified board of a routing device, and the method includes:

receiving a packet, having a frame header, sent by a target board, where the frame header includes a search identifier, a storage address of node data, and a keyword;

when the frame header includes the search identifier, obtaining the node data based on the storage address of the node data in the frame header, where the node data is a correspondence among a prefix, outbound port information of a target prefix, a storage address of next-level node data, and a storage location of the next-level node data;

determining, in the node data, data corresponding to the keyword; and when the data is the outbound port information of the target prefix, sending the packet to a location corresponding to the outbound port information.

With reference to the second aspect, in a first possible implementation, after the step of determining, in the node data, data corresponding to the keyword, the method further includes:

determining whether the data is the outbound port information of the target prefix; and when the data is the outbound port information of the target prefix, performing the step of sending the packet to a location corresponding to the outbound port information; or when the data is not the outbound port information of the target prefix, determining whether the data is the storage address of the next-level node data and the storage location of the next-level node data; when the data is the storage address of the next-level node data and the storage location of the next-level node data, obtaining a storage location of the node data; and when the storage location of the node data is different from the storage location of the next-level node data, adding the search identifier, the storage address of the next-level node data, and a remaining part of the keyword to the frame header of the packet, and sending the packet having the frame header to the storage location of the next-level node data.

With reference to the second aspect, in a second possible implementation, after the step of determining, in the node data, data corresponding to the keyword, the method further includes:

determining whether the data is the outbound port information of the target prefix; and when the data is the outbound port information of the target prefix, performing the step of sending the packet to a location corresponding to the outbound port information; or when the data is not the outbound port information of the target prefix, determining whether the data is the storage address of the next-level node data and the storage location of the next-level node data; when the data is the storage address of the next-level node data and the storage location of the next-level node data, obtaining a storage location of the node data; and when the storage location of the node data is the same as the storage location of the next-level node data, obtaining the next-level node data based on the storage address of the next-level node data, and determining, in the next-level node data, data corresponding to a remaining part of the keyword; and when the data is the outbound port information of the target prefix, sending the packet to the location corresponding to the outbound port information.

With reference to the second aspect, in a third possible implementation, before the step of receiving a packet, having a frame header, sent by a target board, the method further includes:

obtaining each preset target prefix and outbound port information of each target prefix;

creating a plurality pieces of node data based on each target prefix and the outbound port information of each target prefix, where the plurality pieces of node data are classified into at least two levels, and the node data has at least one prefix;

determining a storage location of each of the plurality pieces of node data, a storage location of next-level node data of each piece of node data, and a storage address of the next-level node data of each piece of node data;

adding the storage location of the next-level node data of each piece of node data and the storage address of the next-level node data of each piece of node data to the plurality pieces of node data; and storing the plurality pieces of node data in the storage location corresponding to each piece of node data.

With reference to the second aspect, the first possible implementation of the second aspect, the second possible implementation of the second aspect, or the third possible implementation of the second aspect, in a fourth possible implementation, before the step of receiving a packet, having a frame header, sent by a target board, the method further includes:

allocating each piece of node data to each storage location according to a preset allocation policy, where each storage location is selected from a plurality of boards of the routing device.

According to a third aspect, a route search apparatus is provided, including:

a first obtaining module, configured to obtain a keyword, where the keyword is obtained by translating an IP address in a packet;

a second obtaining module, configured to obtain node data based on a pre-obtained storage address of the node data, where the node data is a correspondence among a prefix, outbound port information of a target prefix, a storage address of next-level node data, and a storage location of the next-level node data;

a first determining module, configured to: determine, in the node data, a prefix matching a first part of the keyword, and determine, in the node data, data corresponding to the prefix, where the keyword includes the first part and a second part;

a third obtaining module, configured to: when the data is the storage address of the next-level node data and the storage location of the next-level node data, obtain a storage location of the node data;

a first adding module, configured to: when the storage location of the node data is different from the storage location of the next-level node data, add a pre-generated search identifier, the storage address of the next-level node data, and the second part of the keyword to a frame header of the packet, where the search identifier is used to indicate that the packet is a packet that needs to be used for subsequent search; and a first storage module, configured to send the packet having the frame header to a specified board corresponding to the storage location of the next-level node data.

With reference to the third aspect, in a first possible implementation, the apparatus further includes:

a first judging module, configured to determine whether the storage location of the node data is the same as the storage location of the next-level node data;

a first execution module, configured to: when the storage location of the node data is the same as the storage location of the next-level node data, obtain the next-level node data based on the storage address of the next-level node data; determine, in the next-level node data, data corresponding to the second part of the keyword; and when the data is the outbound port information of the target prefix, send the packet to a location corresponding to the outbound port information; and a second execution module, configured to: when the storage location of the node data is different from the storage location of the next-level node data, execute the first adding module.

With reference to the third aspect, in a second possible implementation, the apparatus further includes:

a second judging module, configured to determine whether the data is the storage address of the next-level node data and the storage location of the next-level node data;

a third execution module, configured to: when the data is the storage address of the next-level node data and the storage location of the next-level node data, execute the third obtaining module; and a fourth execution module, configured to: when the data is not the storage address of the next-level node data and the storage location of the next-level node data, determine whether the data is the outbound port information of the target prefix; and when the data is the outbound port information of the target prefix, send the packet to a location corresponding to the outbound port information.

With reference to the third aspect, in a third possible implementation, the apparatus further includes:

a fourth obtaining module, configured to obtain each preset target prefix and outbound port information of each target prefix;

a creation module, configured to create a plurality pieces of node data based on each target prefix and the outbound port information of each target prefix, where the plurality pieces of node data are classified into at least two levels, and the node data has at least one prefix;

a second determining module, configured to determine a storage location of each of the plurality pieces of node data, a storage location of next-level node data of each piece of node data, and a storage address of the next-level node data of each piece of node data;

a second adding module, configured to add the storage location of the next-level node data of each piece of node data and the storage address of the next-level node data of each piece of node data to the plurality pieces of node data; and a second storage module, configured to store the plurality pieces of node data in the storage location corresponding to each piece of node data.

With reference to the third aspect, the first possible implementation of the third aspect, the second possible implementation of the third aspect, or the third possible implementation of the third aspect, in a fourth possible implementation, the apparatus further includes:

an allocation module, configured to allocate each piece of node data to each storage location according to a preset allocation policy, where each storage location is selected from a plurality of boards of a routing device.

According to a fourth aspect, a route search apparatus is provided, including:

a receiving module, configured to receive a packet, having a frame header, sent by a target board, where the frame header includes a search identifier, a storage address of node data, and a keyword;

a first obtaining module, configured to: when the frame header includes the search identifier, obtain the node data based on the storage address of the node data in the frame header, where the node data is a correspondence among a prefix, outbound port information of a target prefix, a storage address of next-level node data, and a storage location of the next-level node data;

a first determining module, configured to determine, in the node data, data corresponding to the keyword; and a sending module, configured to: when the data is the outbound port information of the target prefix, send the packet to a location corresponding to the outbound port information.

With reference to the fourth aspect, in a first possible implementation, the apparatus further includes:

a first judging module, configured to determine whether the data is the outbound port information of the target prefix;

a first execution module, configured to: when the data is the outbound port information of the target prefix, execute the sending module;

a second execution module, configured to: when the data is not the outbound port information of the target prefix, determine whether the data is the storage address of the next-level node data and the storage location of the next-level node data; when the data is the storage address of the next-level node data and the storage location of the next-level node data, obtain a storage location of the node data; and when the storage location of the node data is different from the storage location of the next-level node data, add the search identifier, the storage address of the next-level node data, and a remaining part of the keyword to the frame header of the packet, and send the packet having the frame header to the storage location of the next-level node data.

With reference to the fourth aspect, in a second possible implementation, the apparatus further includes:

a second judging module, configured to determine whether the data is the outbound port information of the target prefix;

a third execution module, configured to: when the data is the outbound port information of the target prefix, execute the sending module; and a fourth execution module, configured to: when the data is not the outbound port information of the target prefix, determine whether the data is the storage address of the next-level node data and the storage location of the next-level node data; when the data is the storage address of the next-level node data and the storage location of the next-level node data, obtain a storage location of the node data; when the storage location of the node data is the same as the storage location of the next-level node data, obtain the next-level node data based on the storage address of the next-level node data, and determine, in the next-level node data, data corresponding to a remaining part of the keyword; and when the data is the outbound port information of the target prefix, send the packet to the location corresponding to the outbound port information.

With reference to the fourth aspect, in a third possible implementation, the apparatus further includes:

a second obtaining module, configured to obtain each preset target prefix and outbound port information of each target prefix;

a creation module, configured to create a plurality pieces of node data based on each target prefix and the outbound port information of each target prefix, where the plurality pieces of node data are classified into at least two levels, and the node data has at least one prefix;

a second determining module, configured to determine a storage location of each of the plurality pieces of node data, a storage location of next-level node data of each piece of node data, and a storage address of the next-level node data of each piece of node data;

an adding module, configured to add the storage location of the next-level node data of each piece of node data and the storage address of the next-level node data of each piece of node data to the plurality pieces of node data; and a storage module, configured to store the plurality pieces of node data in the storage location corresponding to each piece of node data.

With reference to the fourth aspect, the first possible implementation of the fourth aspect, the second possible implementation of the fourth aspect, or the third possible implementation of the fourth aspect, in a fourth possible implementation, the apparatus further includes:

an allocation module, configured to allocate each piece of node data to each storage location according to a preset allocation policy, where each storage location is selected from a plurality of boards of a routing device.

According to a fifth aspect, a routing device is provided, including a target board and a specified board, where the target board is configured to: obtain a keyword, where the keyword is obtained by translating an IP address in a packet; obtain node data based on a pre-obtained storage address of the node data, where the node data is a correspondence among a prefix, outbound port information of a target prefix, a storage address of next-level node data, and a storage location of the next-level node data; determine, in the node data, a prefix matching a first part of the keyword, and determine, in the node data, data corresponding to the prefix, where the keyword includes the first part and a second part; when the data is the storage address of the next-level node data and the storage location of the next-level node data, obtain a storage location of the node data; when the storage location of the node data is different from the storage location of the next-level node data, add a pre-generated search identifier, the storage address of the next-level node data, and the second part of the keyword to a frame header of the packet, where the search identifier is used to indicate that the packet is a packet that needs to be used for subsequent search; and send the packet having the frame header to a specified board corresponding to the storage location of the next-level node data; and the specified board is configured to: receive the packet, having the frame header, sent by the target board, where the frame header includes the search identifier, the storage address of the next-level node data, and the second part of the keyword; when the frame header includes the search identifier, obtain the next-level node data based on the storage address of the next-level node data in the frame header; determine, in the next-level node data, data corresponding to the second part of the keyword; and when the data corresponding to the second part of the keyword is the outbound port information of the target prefix, send the packet to a location corresponding to the outbound port information.

Compared with the prior art, the technical solutions provided in the embodiments have the following advantages and characteristics:

In the solutions provided in the present disclosure, the pre-generated node data is searched for corresponding data by using the keyword. When the data is the storage address of the next-level node data and the storage location of the next-level node data, it indicates that corresponding outbound port information is not found in the node data by using the keyword, and the corresponding outbound port information needs to be further searched in the next-level node data by using the second part of the keyword. When the storage location of the node data is different from the storage location of the next-level node data, it indicates that the node data is stored in the target board, and the next-level node data is not stored in the target board. The search identifier, the storage address of the next-level node data, and the second part of the keyword need to be added to the frame header of the packet. The packet having the frame header is sent to the specified board corresponding to the storage location of the next-level node data, so that after the specified board receives the packet having the frame header, the specified board determines, in the next-level node data, the outbound port information corresponding to the second part of the keyword and sends the packet to a location corresponding to an outbound port to forward the packet. There are a plurality of boards in the routing device. According to the solutions provided in the present disclosure, node data generated by a forwarding information table is prestored in the plurality of boards of the routing device, so that all the node data generated by the forwarding information table can be stored without using an external memory. Therefore, the solutions provided in the present disclosure can reduce hardware costs of the routing device.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 2:
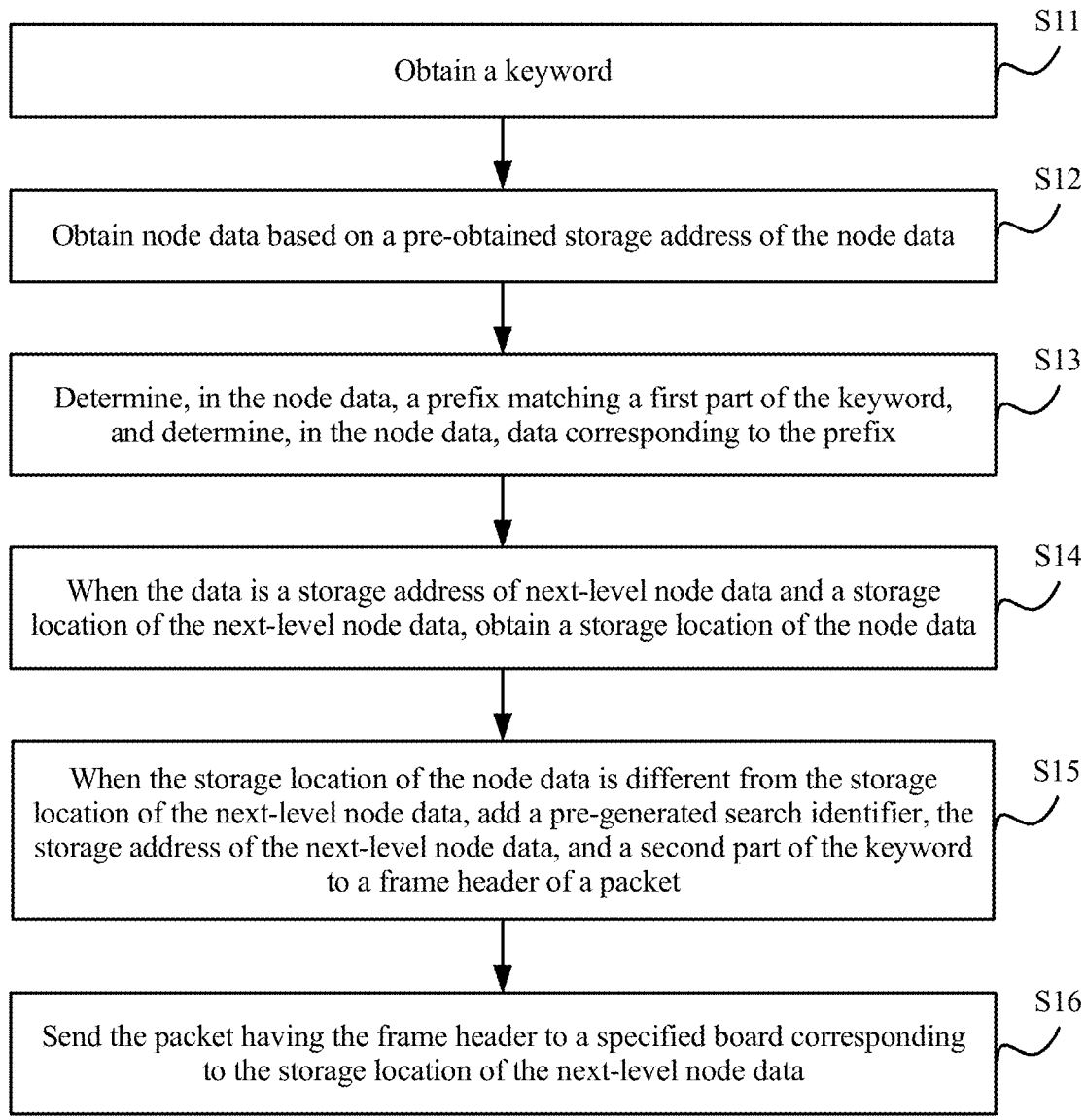
FIG. 2 is a flowchart of a route search method according to an embodiment of the present disclosure.

FIG. 2 is a flowchart of a route search method according to an embodiment of the present disclosure. According to the route search method shown in FIG. 2, node data generated by a forwarding information table may be prestored in a plurality of boards of a routing device, so that all the node data generated by the forwarding information table can be stored without using an external memory. This can reduce hardware costs of the routing device. The method includes the following steps.

Step S11: Obtain a keyword, where the keyword is obtained by translating an IP address in a packet.

The method provided in this embodiment of the present disclosure may be applied to a target board of the routing device. The routing device may be a device configured to forward a packet, such as a router or a switch, and the board may be a line card, a switching board, or the like in the routing device.

A basic function of the line card is to search a routing information table for data corresponding to an IP address of a packet. However, in the solution provided in this embodiment of the present disclosure, the routing information table is divided into a plurality pieces of node data, and therefore the line card is configured to search the node data for the data corresponding to the IP address of the packet. The data is outbound port information, or may be a storage address of next-level node data and a storage location of the next-level node data.

A basic function of the switching board is to forward a packet from an uplink line card to a downlink line card. However, in the solution provided in this embodiment of the present disclosure, the switching board is not only configured to forward the packet from the uplink line card to the downlink line card, but also configured to store pre-allocated node data and search the node data stored in the switching board for data corresponding to an IP address of the packet.

In the prior art, all content of the routing information table is stored in an external memory. In this embodiment of the present disclosure, the routing information table is divided into a plurality pieces of node data. The plurality pieces of node data are separately allocated to different boards in the routing device. For example, the plurality pieces of node data are separately allocated to a plurality of line cards and a plurality of switching boards in the routing device.

Figure 1:
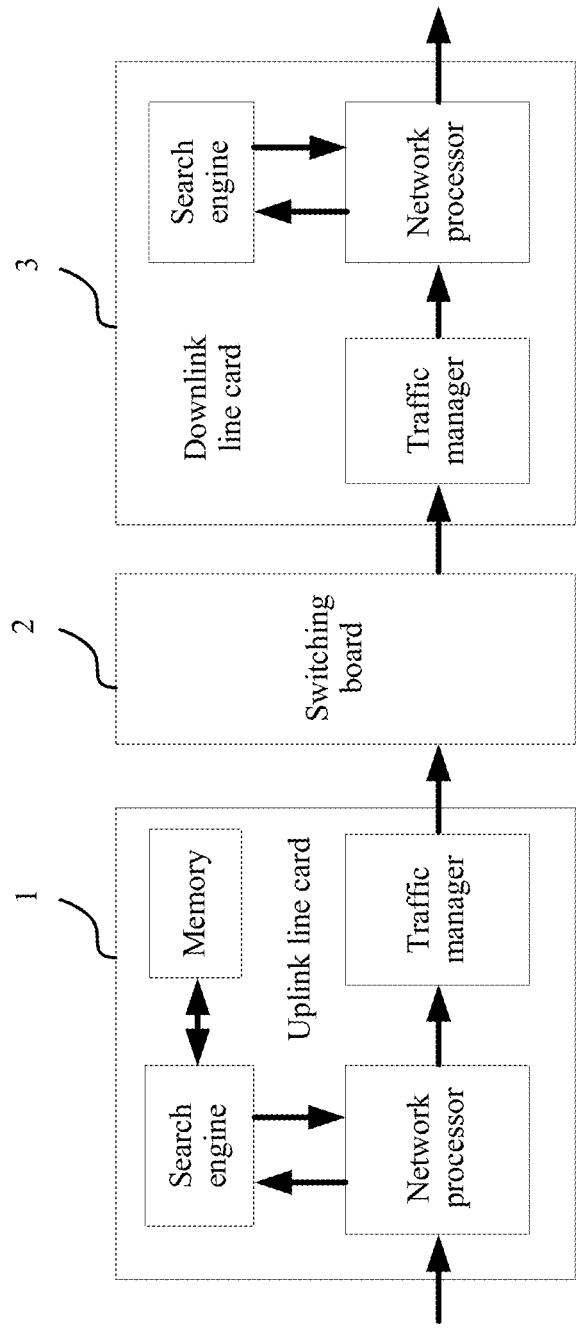
FIG. 1 shows a router architecture according to an embodiment of the present disclosure.

With reference to FIG. 1, when a routing device receives a packet, the packet enters an uplink line card 1. The uplink line card 1 extracts an IP address (Internet Protocol Address, Internet Protocol address) in the packet, and translates the IP address into a binary number. The translated binary number is a keyword.

For example, it is assumed that when the routing device receives the packet, the packet enters the uplink line card 1. The uplink line card 1 extracts an IP address 192.168.1.1 in the packet, and translates the IP address 192.168.1.1 into a binary number 11000000 10101000 00000001 00000001. The binary number 11000000 10101000 00000001 00000001 is the keyword.

Step S12: Obtain node data based on a pre-obtained storage address of the node data.

The node data is a correspondence among a group of pre-generated data. The node data is a correspondence among a prefix, outbound port information of a target prefix, a storage address of next-level node data, and a storage location of the next-level node data.

The prefix and the target prefix are values including binary numbers. There may be one or more binary numbers in the prefix and the target prefix. For example, the prefix may be 0, 1, 00, 10, 000, 001, 010, 011, 100, 101, 110, or 111, and the target prefix may be 0*, 10*, 111*, 0000*, 1001*, 11101*, 11111*, 000011*, 0000100*, or 1110100*.

The outbound port information of the target prefix includes a destination board identifier and a destination port identifier. For example, the outbound port information is a destination board 1 and a destination port 1.

The storage address of the next-level node data and the storage location of the next-level node data that are corresponding to the prefix are stored in the node data. The next-level node data may be obtained based on the storage address of the next-level node data and the storage location of the next-level node data in the node data. Therefore, the next-level node data corresponding to the current-level node data is found based on the storage address and the storage location in the current-level node data.

The storage address is an address of data stored in a memory. For example, the storage address of the next-level node data is 0x000000001.

The storage location refers to a board in the routing device. For example, the storage location may be a line card in the routing device or a switching board in the routing device.

If node data is first-level node data, a board storing the node data prestores a storage address of the node data. If the node data is non-first-level node data, the node data may be obtained by using a storage address in previous-level node data of the node data.

Table 1 lists a structure of node data.

TABLE 1

| Prefix | Outbound port information of a target prefix | Storage location of next-level node data | Storage address of next-level node data |
|---|---|---|---|

There may be a plurality pieces of node data, and therefore each piece of node data needs to be allocated to each storage location according to a preset allocation policy. Each storage location is selected from the plurality of boards of the routing device. The preset allocation policy has a plurality of manners. For example, each piece of node data may be averagely allocated to each storage location. For another example, each piece of node data may be randomly allocated to each storage location. Still for example, to ensure load balancing between boards, a load capacity of a board corresponding to each storage location may be determined first, and then each piece of node data is allocated to each storage location based on the load capacities of the boards. Still for example, to avoid that node data cannot be obtained due to a fault that occurs on a board after the node data is delivered to the board, same node data may be allocated to different boards to ensure that the node data is backed up; after a fault occurs on a board, the same node data may be obtained from another board; and if one piece of node data is allocated to two boards, previous-level node data of the node data stores storage addresses and storage locations of the two boards.

Table 2 lists a structure of node data. It is assumed that second-level node data A is allocated to both a board B and a board C. Therefore, first-level node data D stores a storage address X1 and a storage location Y1 of the board B, and a storage address X2 and a storage location Y2 of the board C, so that a storage location and a storage address of the second-level node data A are found by using the first-level node data D.

TABLE 2

| Prefix | Outbound port information of a target prefix | Storage location of next-level node data | Storage address of next-level node data |
|---|---|---|---|
| 000 | — | X1 | Y1 |
|  |  | X2 | Y2 |

Step S13: Determine, in the node data, a prefix matching a first part of the keyword, and determine, in the node data, data corresponding to the prefix, where the keyword includes the first part and a second part.

After a board obtains the pre-generated node data, the board determines, in the node data, the prefix matching the first part of the keyword. Matching conditions are different in different search methods. Then, the board determines, in the node data, the data corresponding to the prefix. The data corresponding to the prefix refers to the outbound port information, or the data corresponding to the prefix refers to the storage address of the next-level node data and the storage location of the next-level node data.

There are many methods for determining, in the node data, the data corresponding to the prefix. For example, the data corresponding to the prefix may be determined in the node data by using an LPM (longest prefix match) algorithm, or the data corresponding to the prefix may be determined in the node data by using an exact match algorithm. Regardless of which search algorithm is used, the data corresponding to the keyword can be determined in the node data.

The keyword includes the first part and the second part. In step S13, matching is performed by using the first part of the keyword, and the second part of the keyword is not used in this search process.

For example, it is assumed that the keyword is 000011010101, the first part of the keyword is 000, and the second part of the keyword is 011010101. It is determined, in the node data, that the prefix matching the first part 000 of the keyword is 000, and then data corresponding to the prefix 000 is determined in the node data. The second part 011010101 of the keyword is not used in this search process.

Step S14: When the data is a storage address of next-level node data and a storage location of the next-level node data, obtain a storage location of the node data.

After determining, in the node data, the prefix matching the keyword and determining, in the node data, the data corresponding to the prefix, the board needs to determine whether the data is the storage address of the next-level node data and the storage location of the next-level node data. When the board determines that the data is the storage address of the next-level node data and the storage location of the next-level node data, it indicates that corresponding outbound port information is not found in the node data by using the keyword, and the corresponding outbound port information needs to be further searched in the next-level node data by using the second part of the keyword. Therefore, the board needs to obtain the storage location of the node data, to determine whether the storage location of the next-level node data is the same as the storage location of the node data.

Step S15: When the storage location of the node data is different from the storage location of the next-level node data, add a pre-generated search identifier, the storage address of the next-level node data, and the second part of the keyword to a frame header of the packet.

After the board obtains the storage location of the node data, the board further needs to determine whether the storage location of the next-level node data is the same as the storage location of the node data. When the board determines that the storage location of the node data is different from the storage location of the next-level node data, it indicates that the node data is stored in one board and the next-level node data is stored in another board. Therefore, the board needs to add the search identifier, the storage address of the next-level node data, and the second part of the keyword to the frame header of the packet, so as to facilitate subsequent search.

The search identifier is used to indicate that the packet is a packet that needs to be used for subsequent search. Therefore, when the board in the routing device detects that the frame header of the packet includes the search identifier, the board performs subsequent search by using the storage address of the next-level node data and the second part of the keyword in the frame header of the packet. For example, the search identifier may be a character string including a character and a number.

Step S16: Send the packet having the frame header to a specified board corresponding to the storage location of the next-level node data.

After the board adds the search identifier, the storage address of the next-level node data, and the second part of the keyword to the frame header of the packet, the board needs to send the packet having the frame header to the specified board corresponding to the storage location of the next-level node data, so that the specified board performs subsequent search by using data in the frame header to find the outbound port information corresponding to the keyword.

In the embodiment shown in FIG. 2, the board of the routing device may search the pre-generated node data for the corresponding data by using the keyword. When the data is the storage address of the next-level node data and the storage location of the next-level node data, it indicates that the corresponding outbound port information is not found in the node data by using the keyword, and the corresponding outbound port information needs to be further searched in the next-level node data by using the second part of the keyword. When the storage location of the node data is different from the storage location of the next-level node data, it indicates that the node data is stored in the target board, and the next-level node data is not stored in the target board. The search identifier, the storage address of the next-level node data, and the second part of the keyword need to be added to the frame header of the packet. The packet having the frame header is sent to the specified board corresponding to the storage location of the next-level node data, so that after the specified board receives the packet having the frame header, the specified board determines, in the next-level node data, the outbound port information corresponding to the second part of the keyword, and sends the packet to a location corresponding to an outbound port to forward the packet. There are a plurality of boards in the routing device. According to the solution provided in the present disclosure, node data generated by a forwarding information table is prestored in the plurality of boards of the routing device, so that all the node data generated by the forwarding information table can be stored without using an external memory. Therefore, the solution provided in the present disclosure can reduce hardware costs of the routing device.

To explain the embodiment shown in FIG. 2 more clearly, a specific usage scenario is used to describe the embodiment shown in FIG. 2 in the following.

Table 3 lists a structure of node data. In an example listed in Table 3, it is assumed that an obtained keyword is 000011010101, and the node data listed in Table 3 is obtained based on a pre-obtained storage address of node data. Then, it can be determined, in the node data in a manner of longest prefix match, that a prefix matching the keyword 000011010101 is 000, and then data corresponding to the prefix 000 is determined. The data corresponding to the prefix 000 is data in the first row, and therefore the data corresponding to the prefix 000 is a switching board A and 0x00000001. The switching board A is a storage location of next-level node data, and 0x00000001 is a storage address of the next-level node data. The data corresponding to the keyword in the node data is the storage location of the next-level node data and the storage address of the next-level node data, and therefore a storage location of the node data needs to be obtained. It is assumed that the obtained storage location of the node data is a line card B. Therefore, the storage location of the node data is different from the storage location of the next-level node data. Therefore, a search identifier, the storage address 0x00000001 of the next-level node data, and a second part 011010101 of the keyword need to be added to a frame header of a packet, and the packet having the frame header is sent to the storage location of the next-level node data, namely, the switching board A.

TABLE 3

| Prefix | Outbound port information of a target prefix | Storage location of next-level node data | Storage address of next-level node data |
|---|---|---|---|
| 000 | — | Switching board A | 0x00000001 |
| 001 | Destination board 1, and destination port 1 | — | — |
| 010 | Destination board 1, and destination port 1 | — | — |
| 011 | Destination board 1, and destination port 1 | — | — |
| 100 | — | Switching board A | 0x00000002 |
| 101 | Destination board 2, and destination port 2 | — | — |
| 110 | Destination board 10, and destination port 10 | — | — |
| 111 | — | Switching board B | 0x00000003 |

Figure 3:
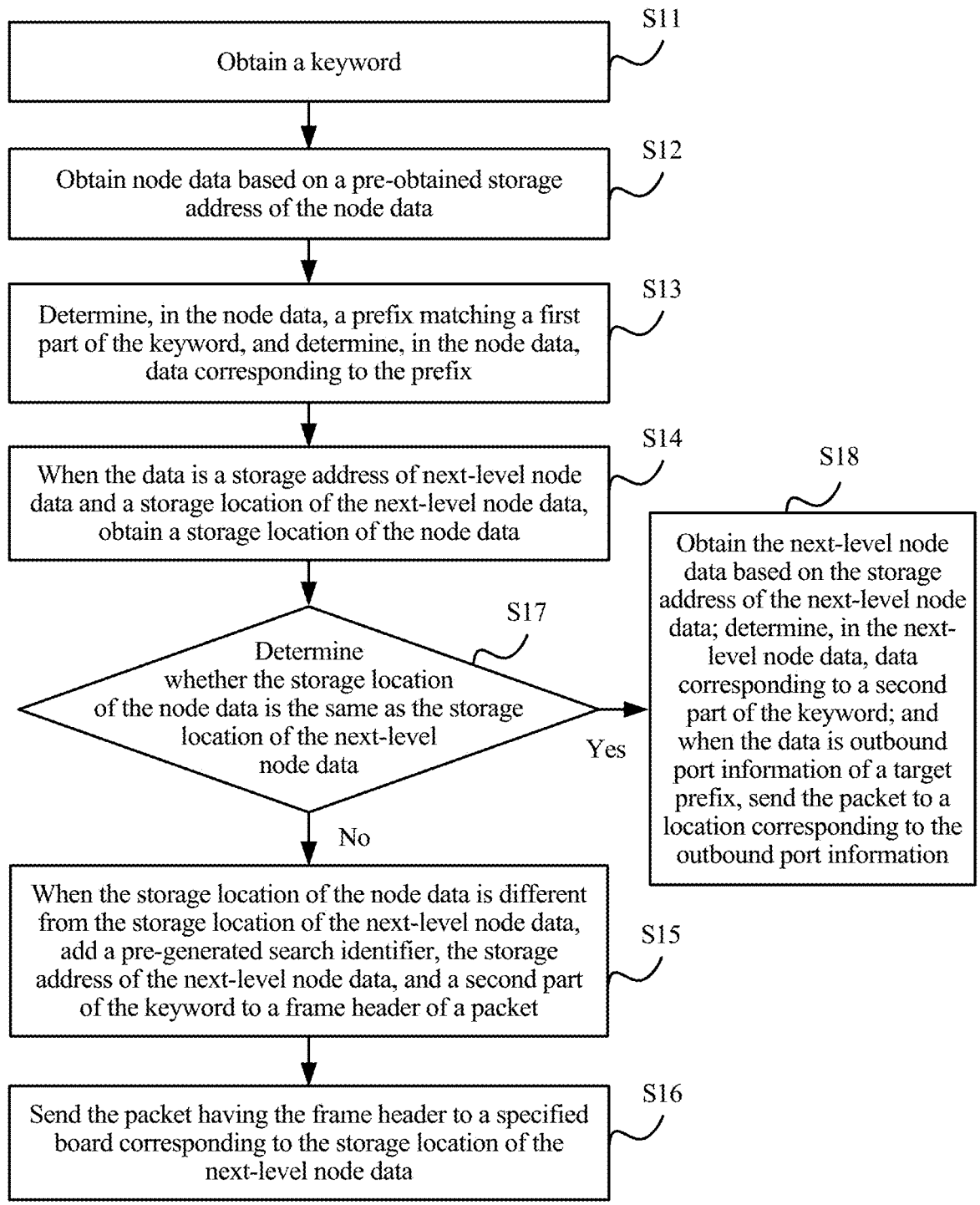
FIG. 3 is a flowchart of another route search method according to an embodiment of the present disclosure.

FIG. 3 is a flowchart of another route search method according to an embodiment of the present disclosure. The embodiment shown in FIG. 3 is an embodiment improved based on FIG. 2. For content same as that in FIG. 2, refer to the embodiment shown in FIG. 2. Compared with the embodiment shown in FIG. 2, after step S14, the embodiment shown in FIG. 3 may further include the following steps.

Step S17: Determine whether a storage location of node data is the same as a storage location of next-level node data. When the storage location of the node data is the same as the storage location of the next-level node data, perform step S18, or when the storage location of the node data is different from the storage location of the next-level node data, perform step S15.

After obtaining the storage location of the node data, a target board of a routing device needs to determine whether the storage location of the node data is the same as the storage location of the next-level node data. If the storage location of the node data is different from the storage location of the next-level node data, it indicates that the node data is stored in the target board and the next-level node data is not stored in the target board. Therefore, step S15 needs to be performed to add a search identifier, a storage address of the next-level node data, and a second part of a keyword to a frame header of a packet, and the packet having the frame header is sent to a specified board corresponding to the storage location of the next-level node data, so that the specified board performs subsequent search after receiving the packet having the frame header. If the storage location of the node data is the same as the storage location of the next-level node data, it indicates that both the node data and the next-level node data are stored in the target board. Therefore, step S18 needs to be performed to perform subsequent search on the target board.

Step S18: Obtain the next-level node data based on a storage address of the next-level node data; determine, in the next-level node data, data corresponding to a second part of a keyword; and when the data is outbound port information of a target prefix, send a packet to a location corresponding to the outbound port information.

When the storage location of the node data is different from the storage location of the next-level node data, the target board may directly obtain the next-level node data by locally using the storage address of the next-level node data, and perform subsequent search by using the next-level node data.

In the embodiment shown in FIG. 3, because each piece of node data may be stored in a different board, if the storage location of the next-level node data is the same as the storage location of the node data, it is only necessary to obtain the next-level node data by locally using the storage address of the next-level node data, and perform subsequent search. If the storage location of the next-level node data is different from the storage location of the node data, the search identifier, the storage address of the next-level node data, and the second part of the keyword need to be added to the frame header of the packet, and the packet having the frame header is sent to the specified board corresponding to the storage location of the next-level node data, so that the specified board obtains the next-level node data by using the storage address of the next-level node data and performs subsequent search.

Figure 4:
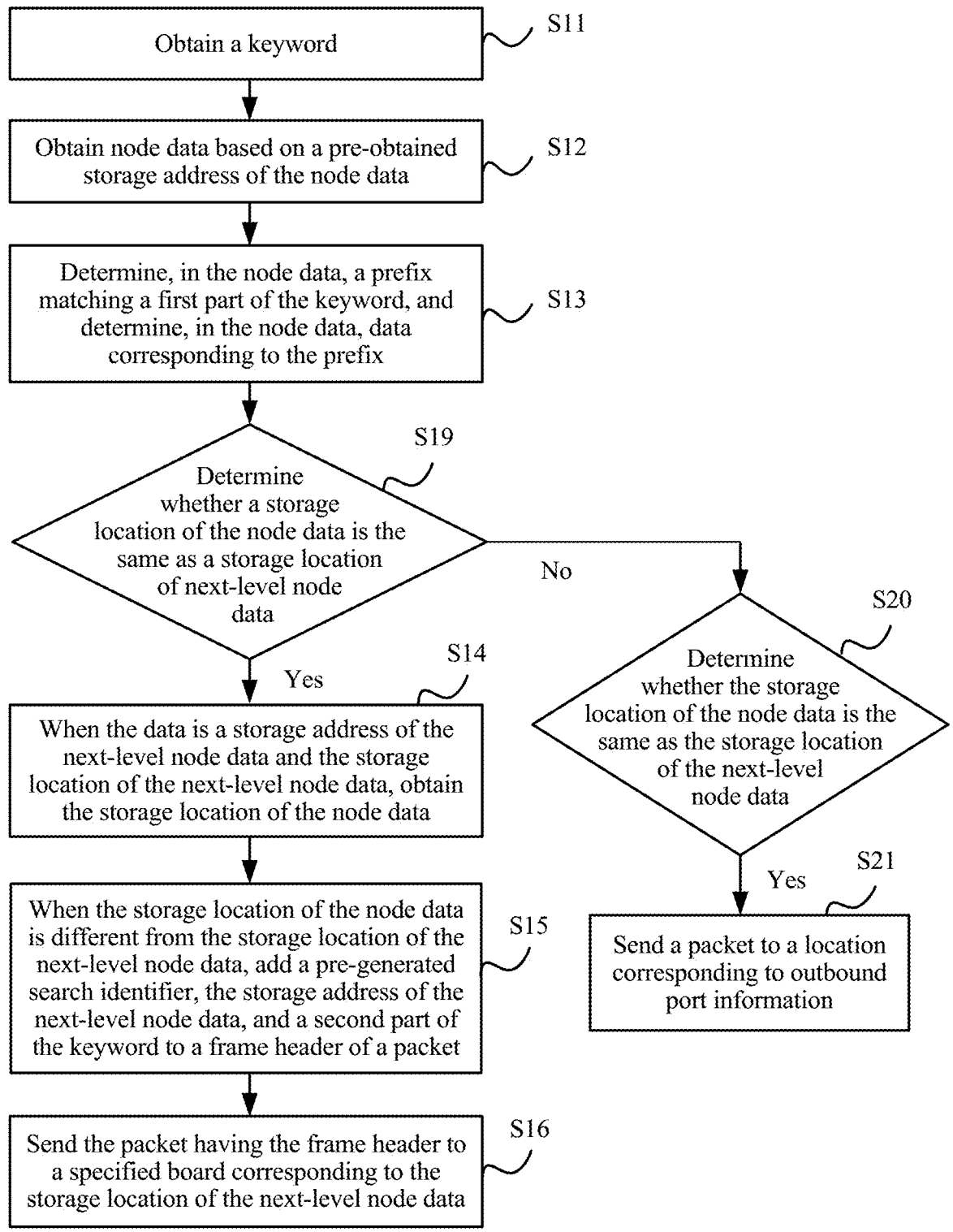
FIG. 4 is a flowchart of another route search method according to an embodiment of the present disclosure.

FIG. 4 is a flowchart of another route search method according to an embodiment of the present disclosure. The embodiment shown in FIG. 4 is an embodiment improved based on FIG. 2. For content same as that in FIG. 2, refer to the embodiment shown in FIG. 2. Compared with the embodiment shown in FIG. 2, after step S13, the embodiment shown in FIG. 4 may further include the following steps.

Step S19: Determine whether data is a storage address of next-level node data and a storage location of the next-level node data. When the data is the storage address of the next-level node data and the storage location of the next-level node data, perform step S14. When the data is not the storage address of the next-level node data and the storage location of the next-level node data, perform step S20.

After determining, in node data, a prefix matching a keyword and determining, in the node data, data corresponding to the prefix, a target board of a router needs to determine whether the data is the storage address of the next-level node data and the storage location of the next-level node data. When the data is the storage address of the next-level node data and the storage location of the next-level node data, it indicates that corresponding outbound port information is not found in the node data by using the keyword, and the corresponding outbound port information needs to be further searched in the next-level node data by using a second part of the keyword. Therefore, step S14 needs to be performed. When the data is not the storage address of the next-level node data and the storage location of the next-level node data, step S20 needs to be performed to determine whether the data is outbound port information of a target prefix.

Step S20: Determine whether the data is outbound port information of a target prefix, and when the data is the outbound port information of the target prefix, perform step S21.

When the target board of the routing device determines that the data is the outbound port information of the target prefix, the target board needs to send a packet to a location corresponding to the outbound port information, so that the packet can be forwarded at the location corresponding to the outbound port information, to complete a current route search procedure.

Step S21: Send a packet to a location corresponding to the outbound port information.

The location corresponding to the outbound port information refers to a board in the routing device. For example, if the outbound port information is a port 3 of a line card A, the target board of the routing device sends the packet to the line card A corresponding to the outbound port information, so that the line card A forwards the packet through the port 3.

In the embodiment shown in FIG. 4, after determining, in the node data, the prefix matching the keyword and determining, in the node data, the data corresponding to the prefix, the target board of the routing device further needs to determine whether the data is the storage address of the next-level node data and the storage location of the next-level node data or the outbound port information. If the data is the storage address of the next-level node data and the storage location of the next-level node data, it indicates that the corresponding outbound port information is not found in the node data by using the keyword, and the corresponding outbound port information needs to be further searched in the next-level node data by using the second part of the keyword. If the data is the outbound port information, it indicates that the corresponding outbound port information is found in the node data by using the keyword, and the target board may directly send the packet to the location corresponding to the outbound port information, to end the route search procedure.

Figure 5:
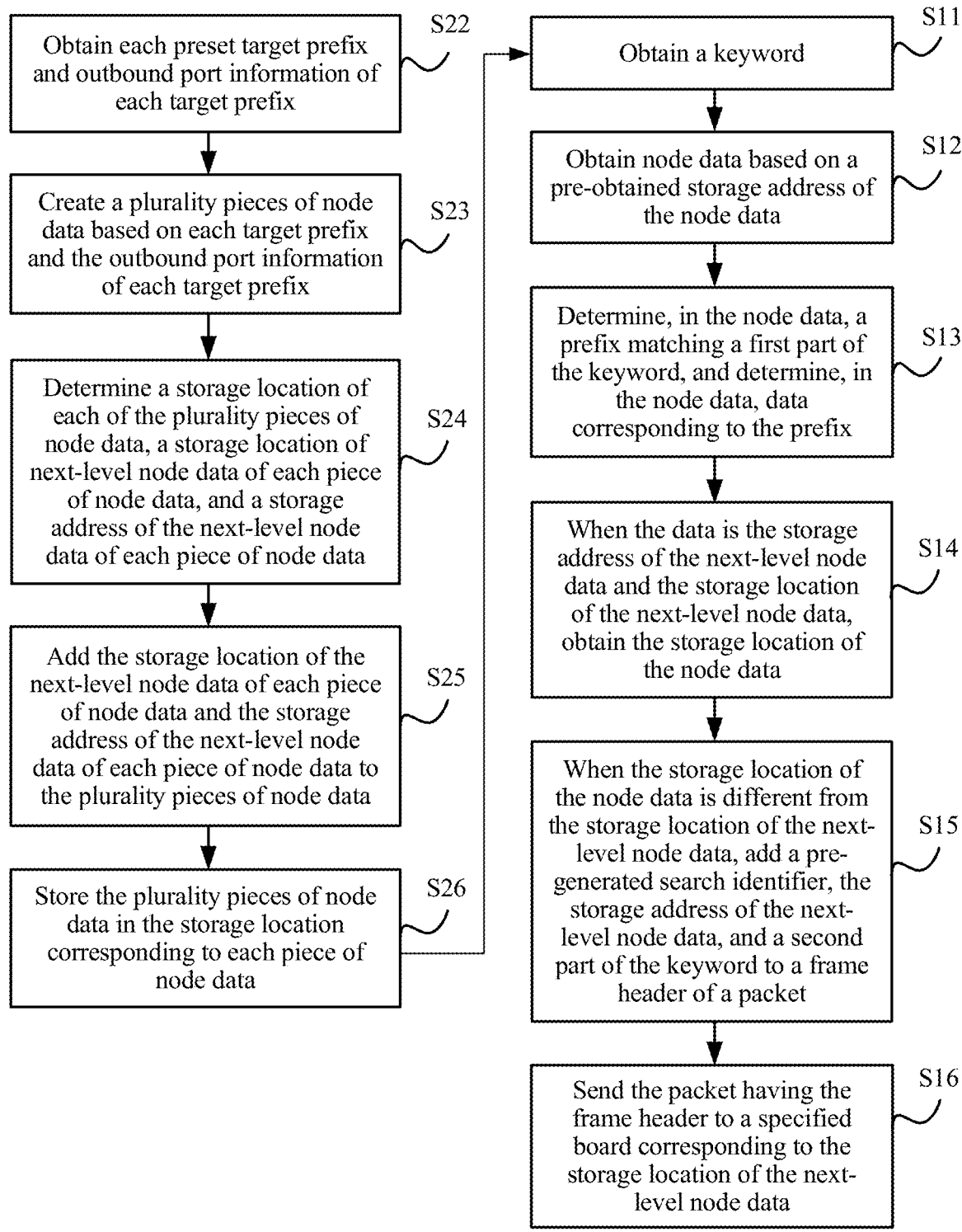
FIG. 5 is a flowchart of another route search method according to an embodiment of the present disclosure.

FIG. 5 is a flowchart of another route search method according to an embodiment of the present disclosure. The embodiment shown in FIG. 5 is an embodiment improved based on FIG. 2. For content same as that in FIG. 2, refer to the embodiment shown in FIG. 2. Compared with the embodiment shown in FIG. 2, before step S11, the embodiment shown in FIG. 5 may further include the following steps.

Step S22: Obtain each preset target prefix and outbound port information of each target prefix.

Before step S11, that is, before route search is performed in node data by using a keyword, each piece of node data needs to be created. In this embodiment, step S22 to step S26 describe a process of creating each piece of node data. Certainly, step S22 to step S26 describe only one manner of creating each piece of node data, and a person skilled in the art may derive another manner of creating each piece of node data based on step S22 to step S26.

Step S23: Create a plurality pieces of node data based on each target prefix and the outbound port information of each target prefix, where the plurality pieces of node data are classified into at least two levels, and the node data has at least one prefix.

The target prefix is preset data. There may be a plurality of target prefixes, and each target prefix is corresponding one piece of outbound port information. There are a plurality of manners of classifying the plurality pieces of node data into a plurality of levels. For example, the plurality pieces of node data may be classified into a plurality of levels by using a plurality of methods such as based on a fixed step, a dynamic step, post-order traversal, or pre-order traversal.

Each piece of node data has at least one prefix, and the prefix is used to match against the keyword in a search process.

Step S24: Determine a storage location of each of the plurality pieces of node data, a storage location of next-level node data of each piece of node data, and a storage address of the next-level node data of each piece of node data.

Each piece of node data needs to be pre-allocated a storage location. In step S24, the storage location of each piece of node data and the storage location of the next-level node data of each piece of node data may be determined based on a pre-allocation status. In addition, at the time of creating the plurality pieces of node data, a storage address of each piece of node data is determined. Therefore, the storage address of the next-level node data of each piece of node data may be directly determined.

Step S25: Add the storage location of the next-level node data of each piece of node data and the storage address of the next-level node data of each piece of node data to the plurality pieces of node data.

After the storage location of the next-level node data of each piece of node data and the storage address of the next-level node data of each piece of node data are determined, the storage location of the next-level node data of each piece of node data and the storage address of the next-level node data of each piece of node data may be added to the plurality pieces of node data.

Step S26: Store the plurality pieces of node data in the storage location corresponding to each piece of node data.

In the embodiment shown in FIG. 5, the plurality pieces of node data may be created based on each target prefix and the outbound port information of each target prefix, the storage location of the next-level node data of each piece of node data and the storage address of the next-level node data of each piece of node data are added to the plurality pieces of node data, and finally, each piece of node data is stored in the corresponding storage location. This makes preparation for searching the node data for the keyword subsequently.

To describe a specific implementation of the embodiment shown in FIG. 5, an embodiment is used to describe how to create a plurality pieces of node data based on a search tree in the following. Certainly, there are a plurality of manners of creating node data, and creating the node data by using the search tree is not restrictive. The creating the plurality pieces of node data based on the search tree includes the following steps.

Step A: Obtain each preset target prefix and outbound port information of each target prefix.

In step A, the target prefix is preset data. There may be a plurality of target prefixes, and each target prefix is corresponding one piece of outbound port information.

Step B: Create a search tree based on each target prefix, where each target prefix is corresponding to one node in the search tree.

There are many types of search trees. For example, a binary tree may be created based on each target prefix. For another example, a multiway tree may be created based on each target prefix. For another example, a path compression tree may be created based on each target prefix. Certainly, the search tree is not limited to the binary tree, the multiway tree, or the path compression tree in this embodiment of the present disclosure, and the search tree may be another type of search tree.

Step C: Divide the search tree into a plurality of levels, where each level of the search tree includes at least one subtree, and the subtree includes at least one node.

The search tree has a plurality of nodes. After the search tree is divided into a plurality of levels, there are a plurality of subtrees in the search tree, and each subtree includes at least one node.

There are a plurality of manners of dividing the search tree into a plurality of levels. For example, the search tree may be divided into a plurality of levels by using a plurality of methods such as based on a fixed step, a dynamic step, post-order traversal, or pre-order traversal, so that the search tree is evolved into a plurality of subtrees.

Step D: Determine a storage location corresponding to each subtree in the search tree and a storage location of a next-level subtree corresponding to each subtree.

Each subtree is corresponding to one piece of node data, and therefore each subtree needs to be pre-allocated to the storage location. Therefore, in step D, the storage location corresponding to each subtree and the storage location of the next-level subtree corresponding to each subtree may be determined based on a pre-allocation status.

Step E: Determine a target prefix and a next-level subtree that are corresponding to a prefix of each subtree in the search tree.

A search path of each subtree is the prefix of each subtree, and the prefix of each subtree may be corresponding to the target prefix or the next-level subtree. A prefix of each subtree is corresponding to only one target prefix or only one next-level subtree, and the prefix of each subtree cannot be corresponding to one target prefix and one next-level subtree.

Step F: Create node data of each subtree, where the node data is a correspondence among the prefix of each subtree, outbound port information of the target prefix, a storage address of the next-level subtree, and the storage location of the next-level subtree.

After the target prefix and the next-level subtree that are corresponding to the prefix of each subtree in the search tree are determined, the node data may be created based on the prefix of each subtree, the outbound port information of the target prefix, the storage address of the next-level subtree, and the storage location of the next-level subtree. There may be a correspondence between the prefix of each subtree and the outbound port information of the target prefix, and there may be a correspondence between the prefix of each subtree and both the storage address of the next-level subtree and the storage location of the next-level subtree. All data in a correspondence with the prefix of each subtree needs to be centralized to generate the node data. The finally generated node data is the structure shown in Table 3.

Step G: Store the node data of each subtree in the storage location corresponding to each subtree.

After the node data of each subtree is created, it is only necessary to store the node data in the corresponding storage location, so that route search can be performed by using node data stored in different storage locations in a subsequent step.

For example, it is assumed that the search tree has five subtrees: a subtree A1, a subtree B1, a subtree C1, a subtree D1, and a subtree E1. Next-level subtrees of the subtree A1 are the subtree B1 and the subtree C1, and next-level subtrees of the subtree B1 are the subtree D1 and the subtree E1. Node data of the subtree A1 is A2, node data of the subtree B1 is B2, node data of the subtree C1 is C2, node data of the subtree D1 is D2, and node data of the subtree E1 is E2. It is assumed that the node data A2 is allocated to a board X1, the node data B2 and the node data C2 are allocated to a board X2, the node data D2 is allocated to a board X3, and the node data E2 is allocated to a board X4.

Figure 6:
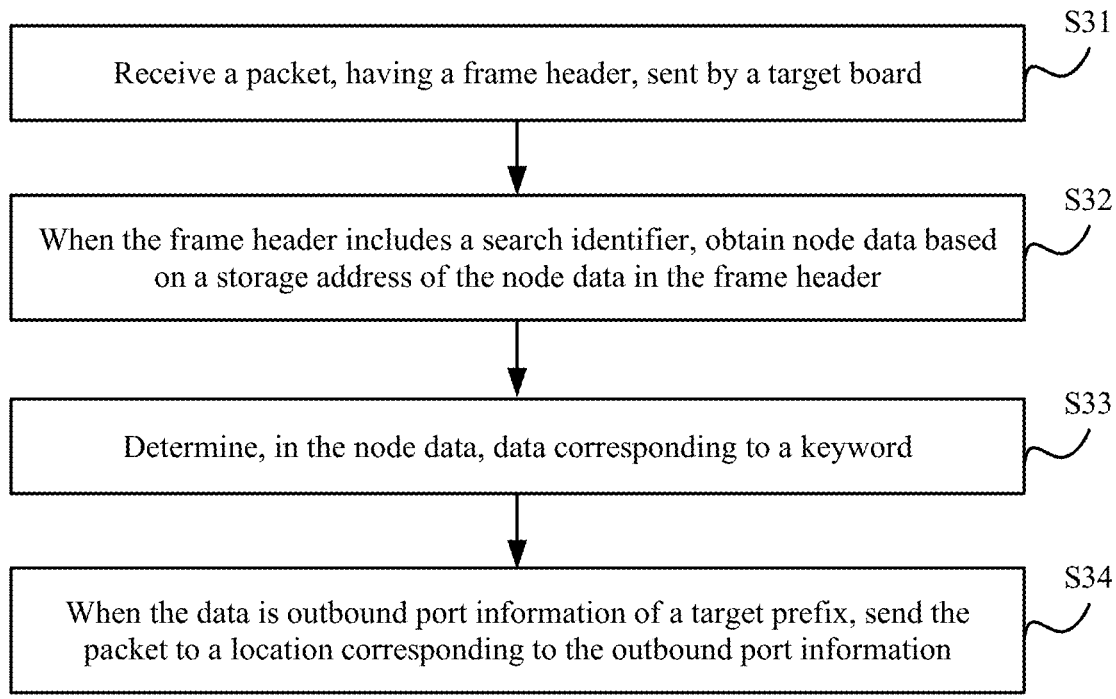
FIG. 6 is a flowchart of another route search method according to an embodiment of the present disclosure.

FIG. 6 is a flowchart of another route search method according to an embodiment of the present disclosure. FIG. 6 is an embodiment corresponding to FIG. 2. The embodiment shown in FIG. 6 needs to be implemented coordinately with the embodiment shown in FIG. 2. For content in the embodiment shown in FIG. 6 that is the same as that in the embodiment shown in FIG. 2, refer to the embodiment shown in FIG. 2. According to the route search method shown in FIG. 6, node data generated by a forwarding information table may be prestored in a plurality of boards of a routing device, so that all the node data generated by the forwarding information table can be stored without using an external memory. This can reduce hardware costs of the routing device. The method includes the following steps.

Step S31: Receive a packet, having a frame header, sent by a target board, where the frame header includes a search identifier, a storage address of node data, and a keyword.

The method provided in this embodiment of the present disclosure may be applied to a specified board of the routing device. The routing device may be a device configured to forward a packet, such as a router or a switch, and the board may be a line card, a switching board, or the like in the routing device.

After the target board of the routing device sends the packet having the frame header to the specified board of the routing device, the specified board receives the packet, having the frame header, sent by the target board. The target board pre-adds the search identifier, the storage address of the node data, and the keyword to the frame header of the packet, and therefore the specified board may parse out the search identifier, the storage address of the node data, and the keyword in the frame header.

There may be a plurality pieces of node data, and therefore each piece of node data needs to be allocated to each storage location according to a preset allocation policy. Each storage location is selected from the plurality of boards of the routing device. The preset allocation policy has a plurality of manners. For example, each piece of node data may be averagely allocated to each storage location. For another example, each piece of node data may be randomly allocated to each storage location. Still for example, to ensure load balancing between boards, a load capacity of a board corresponding to each storage location may be determined first, and then each piece of node data is allocated to each storage location based on the load capacities of the boards. Still for example, to avoid that node data cannot be obtained due to a fault that occurs on a board after the node data is delivered to the board, same node data may be allocated to different boards to ensure that the node data is backed up; after a fault occurs on a board, the same node data may be obtained from another board; and if one piece of node data is allocated to two boards, previous-level node data of the node data stores storage addresses and storage locations of the two boards.

Step S32: When the frame header includes the search identifier, obtain the node data based on the storage address of the node data in the frame header, where the node data is a correspondence among a prefix, outbound port information of a target prefix, a storage address of next-level node data, and a storage location of the next-level node data.

After the specified board receives the packet, having the frame header, sent by the target board, the specified board needs to determine whether the frame header of the packet includes the search identifier. If the board determines that the frame header of the packet does not include the search identifier, it indicates that a normal packet forwarding procedure needs to be executed for the packet on the specified board. If the board determines that the frame header of the packet includes the search identifier, it indicates that the packet is only used for route search on the specified board, and the specified board needs to obtain the node data based on the storage address of the node data in the frame header.

Step S33: Determine, in the node data, data corresponding to the keyword.

The data corresponding to the keyword may be the outbound port information, or may be the storage address of the next-level node data and the storage location of the next-level node data.

Step S34: When the data is the outbound port information of the target prefix, send the packet to a location corresponding to the outbound port information.

When the data is the outbound port information of the target prefix, it indicates that route search is completed. The specified board needs to send the packet to the location corresponding to the outbound port information, to end the route search procedure.

In the embodiment shown in FIG. 6, the corresponding data is searched in pre-generated node data by using the keyword. When the data is the storage address of the next-level node data and the storage location of the next-level node data, it indicates that the corresponding outbound port information is not found in the node data by using the keyword, and the corresponding outbound port information needs to be further searched in the next-level node data by using a second part of the keyword. When a storage location of the node data is different from the storage location of the next-level node data, it indicates that the node data is stored in the target board and the next-level node data is not stored in the target board. The search identifier, the storage address of the next-level node data, and the second part of the keyword need to be added to the frame header of the packet. The packet having the frame header is sent to the specified board corresponding to the storage location of the next-level node data, so that after the specified board receives the packet having the frame header, the specified board determines, in the next-level node data, the outbound port information corresponding to the second part of the keyword and sends the packet to a location corresponding to an outbound port to forward the packet. There are a plurality of boards in the routing device. According to the solution provided in the present disclosure, the node data generated by the forwarding information table is prestored in the plurality of boards of the routing device, so that all the node data generated by the forwarding information table can be stored without using an external memory. Therefore, the solution provided in the present disclosure can reduce hardware costs of the routing device.

To explain the embodiment shown in FIG. 6 more clearly, a specific usage scenario is used to describe the embodiment shown in FIG. 6 in the following.

Table 3 lists a structure of node data. In an example shown in Table 3, the specified board of the routing device receives a packet, having a frame header, sent by the target board. The frame header includes a search identifier, a storage address 0x10000001 of the node data, and a keyword 011010101. The specified board may determine that the frame header includes the search identifier, and therefore the specified board obtains the node data listed in Table 3 based on the storage address 0x10000001 of the node data in the frame header. After the specified board obtains the node data listed in Table 3, the specified board needs to determine, in the node data, data corresponding to the keyword 011010101. The data corresponding to the keyword 011010101 is outbound port information of a target prefix: a destination board 1 and a destination port 1, and therefore the specified board sends the packet to a location corresponding to the outbound port information.

Figure 7:
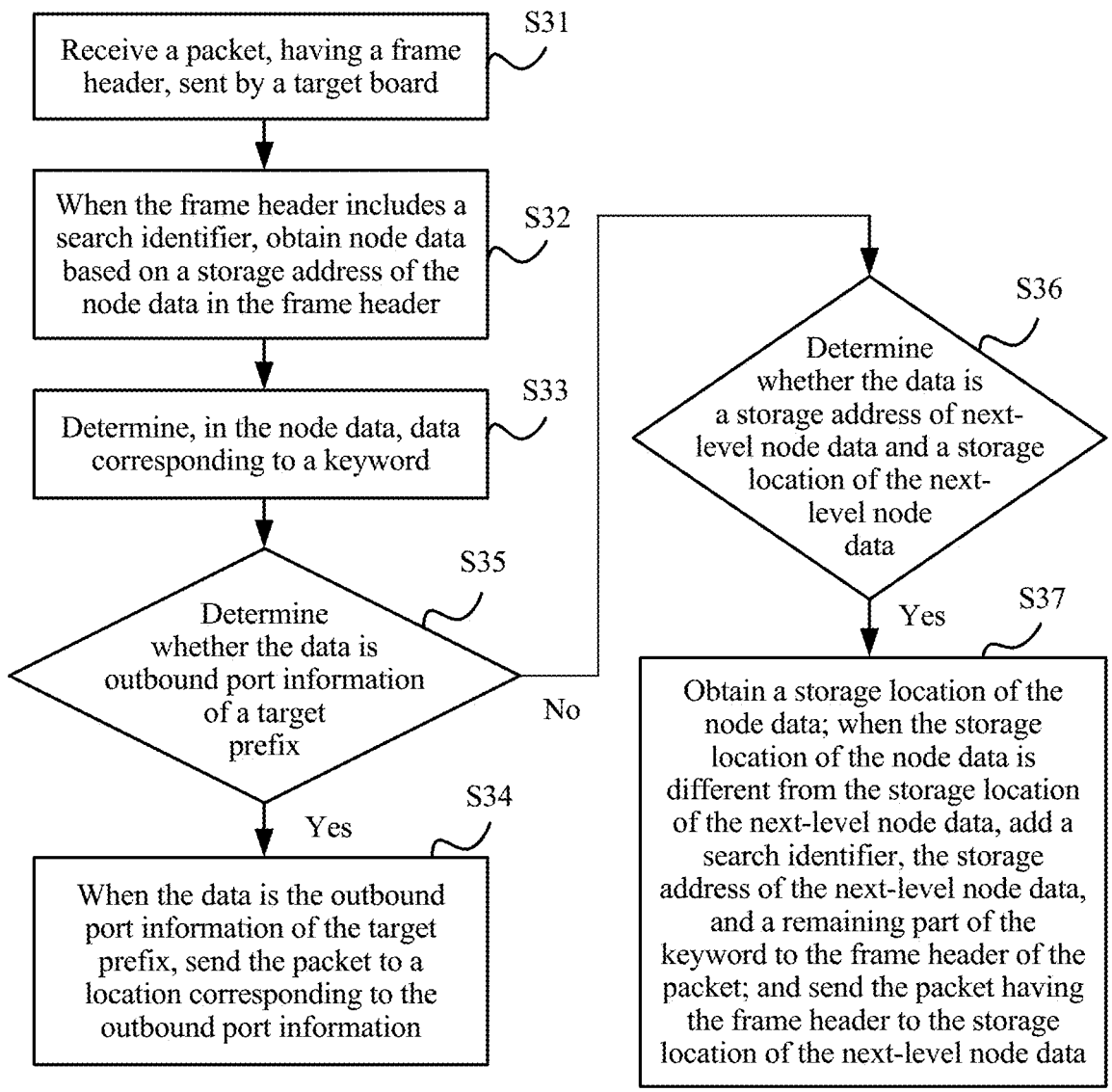
FIG. 7 is a flowchart of another route search method according to an embodiment of the present disclosure.

FIG. 7 is a flowchart of another route search method according to an embodiment of the present disclosure. The embodiment shown in FIG. 7 is an embodiment improved based on FIG. 6. For content same as that in FIG. 6, refer to the embodiment shown in FIG. 6. Compared with the embodiment shown in FIG. 6, after step S33, the embodiment shown in FIG. 7 may further include the following steps.

Step S35: Determine whether data is outbound port information of a target prefix. When the data is the outbound port information of the target prefix, perform step S34, or when the data is not the outbound port information of the target prefix, perform step S36.

After determining, in node data, data corresponding to a keyword, a specified board needs to determine whether the data is the outbound port information of the target prefix. If the data is the outbound port information of the target prefix, it indicates that the required outbound port information is found, and step S34 is performed to send a packet to a location corresponding to the outbound port information, so as to complete search work. If the data is not the outbound port information of the target prefix, it indicates that the required outbound port information has not been found, subsequent search is required, and step S36 needs to be performed to perform subsequent search.

Step S36: Determine whether the data is a storage address of next-level node data and a storage location of the next-level node data, and when the data is the storage address of the next-level node data and the storage location of the next-level node data, perform step S37.

Step S37: Obtain a storage location of node data; when the storage location of the node data is different from the storage location of the next-level node data, add a search identifier, the storage address of the next-level node data, and a remaining part of a keyword to a frame header of a packet; and send the packet having the frame header to the storage location of the next-level node data.

When determining that the data is the storage address of the next-level node data and the storage location of the next-level node data, the specified board needs to obtain the storage location of the node data. When the storage location of the node data is different from the storage location of the next-level node data, it indicates that the next-level node data is not locally stored. Therefore, the specified board needs to add the search identifier, the storage address of the next-level node data, and the remaining part of the keyword to the frame header of the packet, and sends the packet having the frame header to the storage location of the next-level node data.

Figure 8:
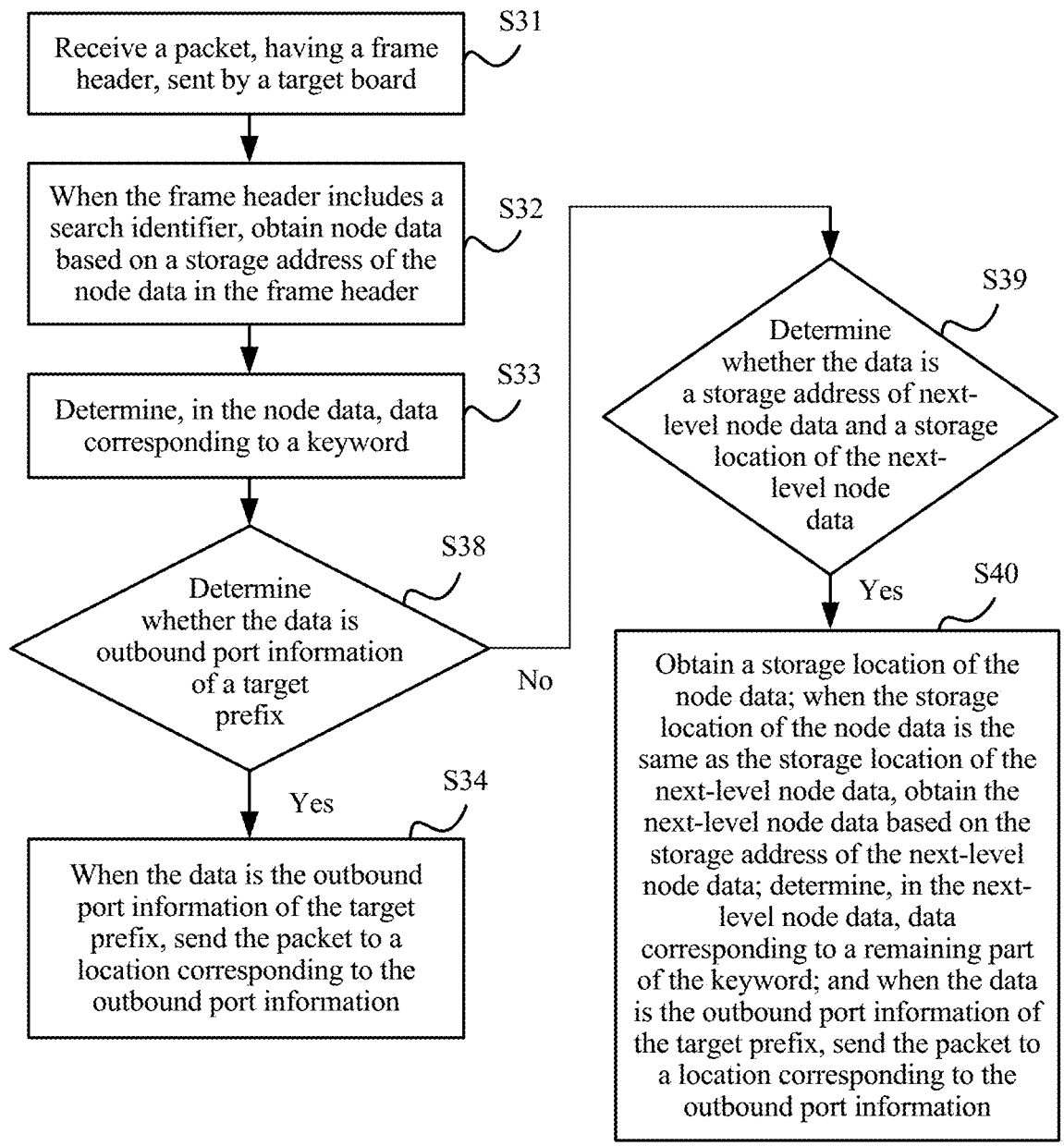
FIG. 8 is a flowchart of another route search method according to an embodiment of the present disclosure.

FIG. 8 is a flowchart of another route search method according to an embodiment of the present disclosure. The embodiment shown in FIG. 8 is an embodiment improved based on FIG. 6. For content same as that in FIG. 6, refer to the embodiment shown in FIG. 6. Compared with the embodiment shown in FIG. 6, after step S33, the embodiment shown in FIG. 8 may further include the following steps.

Step S38: Determine whether data is outbound port information of a target prefix. When the data is the outbound port information of the target prefix, perform step S34, or when the data is not the outbound port information of the target prefix, perform step S39.

After determining, in node data, data corresponding to a keyword, a specified board needs to determine whether the data is the outbound port information of the target prefix. If the data is the outbound port information of the target prefix, it indicates that the required outbound port information is found, and step S34 is performed to send a packet to a location corresponding to the outbound port information, so as to complete search work. If the data is not the outbound port information of the target prefix, it indicates that the required outbound port information has not been found, subsequent search is required, and step S39 needs to be performed to perform subsequent search.

Step S39: Determine whether the data is a storage address of next-level node data and a storage location of the next-level node data, and when the data is the storage address of the next-level node data and the storage location of the next-level node data, perform step S40.

Step S40: Obtain a storage location of node data; when the storage location of the node data is the same as the storage location of the next-level node data, obtain the next-level node data based on the storage address of the next-level node data; determine, in the next-level node data, data corresponding to a remaining part of a keyword; and when the data is the outbound port information of the target prefix, send the packet to a location corresponding to the outbound port information.

When determining that the data is the storage address of the next-level node data and the storage location of the next-level node data, the specified board needs to obtain the storage location of the node data. When the storage location of the node data is the same as the storage location of the next-level node data, it indicates that the specified board may locally obtain the next-level node data, determine, in the next-level node data, the data corresponding to the remaining part of the keyword, and when the data is the outbound port information of the target prefix, send the packet to the location corresponding to the outbound port information.

Figure 9:
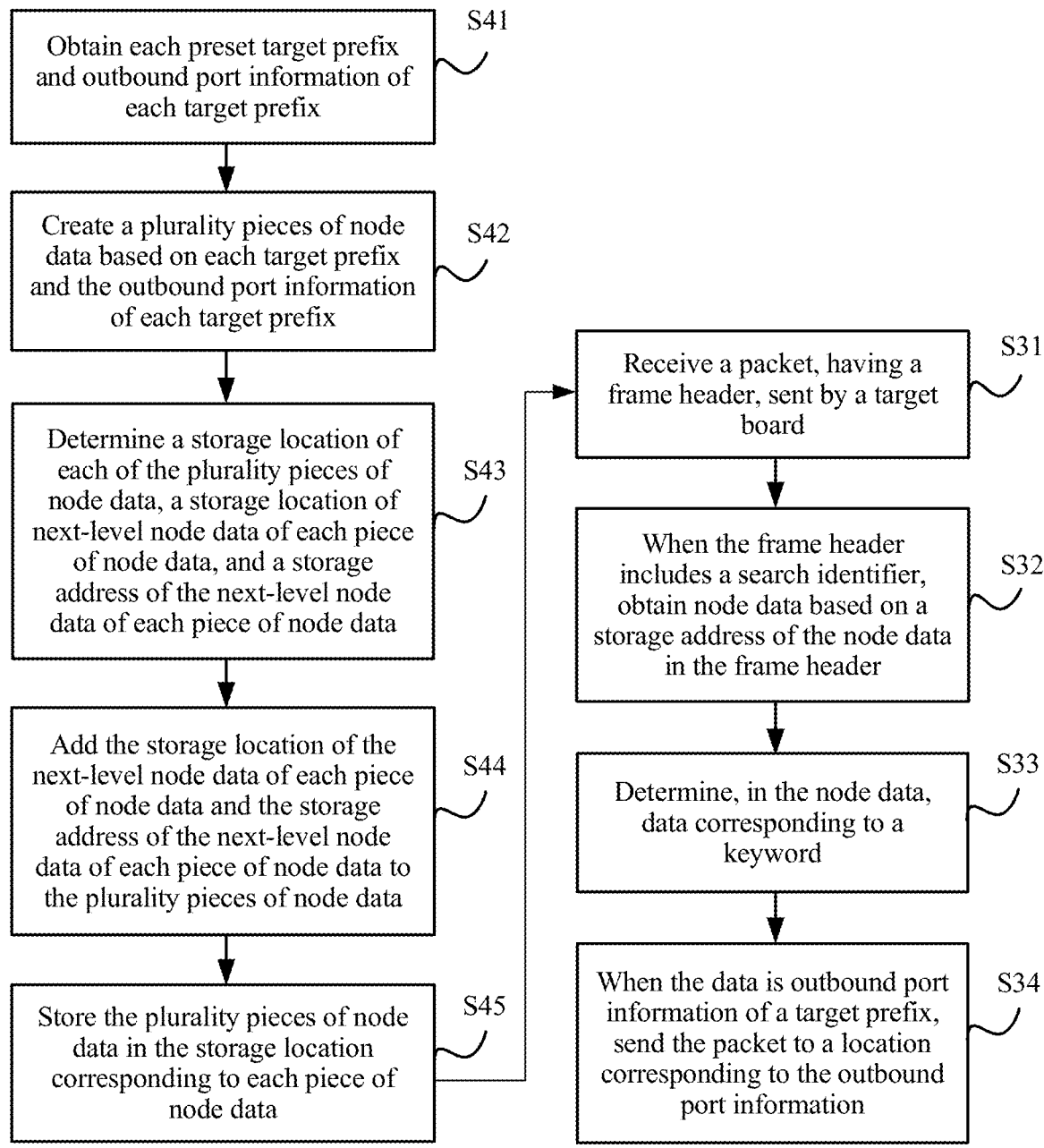
FIG. 9 is a flowchart of another route search method according to an embodiment of the present disclosure.

FIG. 9 is a flowchart of another route search method according to an embodiment of the present disclosure. The embodiment shown in FIG. 9 is an embodiment improved based on FIG. 6. For content same as that in FIG. 6, refer to the embodiment shown in FIG. 6. Compared with the embodiment shown in FIG. 6, before step S31, the embodiment shown in FIG. 9 may further include the following steps.

Step S41: Obtain each preset target prefix and outbound port information of each target prefix.

Before step S31, that is, before a packet having a frame header sent by a target board is received, each piece of node data needs to be created. In this embodiment, step S41 to step S45 describe a process of creating each piece of node data. Certainly, step S41 to step S45 describe only one manner of creating each piece of node data, and a person skilled in the art may derive another manner of creating each piece of node data based on step S41 to step S45.

Step S42: Create a plurality pieces of node data based on each target prefix and the outbound port information of each target prefix, where the plurality pieces of node data are classified into at least two levels, and the node data has at least one prefix.

The target prefix is preset data. There may be a plurality of target prefixes, and each target prefix is corresponding one piece of outbound port information. There are a plurality of manners of classifying the plurality pieces of node data into a plurality of levels. For example, the plurality pieces of node data may be classified into a plurality of levels by using a plurality of methods such as based on a fixed step, a dynamic step, post-order traversal, or pre-order traversal.

Each piece of node data has at least one prefix, and the prefix is used to match against a keyword in a search process.

Step S43: Determine a storage location of each of the plurality pieces of node data, a storage location of next-level node data of each piece of node data, and a storage address of the next-level node data of each piece of node data.

Each piece of node data needs to be pre-allocated a storage location. In step S43, the storage location of each piece of node data and the storage location of the next-level node data of each piece of node data may be determined based on a pre-allocation status. In addition, at the time of creating the plurality pieces of node data, a storage address of each piece of node data is determined. Therefore, the storage address of the next-level node data of each piece of node data may be directly determined.

Step S44: Add the storage location of the next-level node data of each piece of node data and the storage address of the next-level node data of each piece of node data to the plurality pieces of node data.

After the storage location of the next-level node data of each piece of node data and the storage address of the next-level node data of each piece of node data are determined, the storage location of the next-level node data of each piece of node data and the storage address of the next-level node data of each piece of node data may be added to the plurality pieces of node data.

Step S45: Store the plurality pieces of node data in the storage location corresponding to each piece of node data.

In the embodiment shown in FIG. 9, the plurality pieces of node data may be created based on each target prefix and the outbound port information of each target prefix, the storage location of the next-level node data of each piece of node data and the storage address of the next-level node data of each piece of node data are added to the plurality pieces of node data, and finally, each piece of node data is stored in the corresponding storage location. This makes preparation for searching the node data for the keyword subsequently.

To describe a specific implementation of the embodiment shown in FIG. 9, an embodiment is used to describe how to create a plurality pieces of node data based on a search tree in the following. Certainly, there are a plurality of manners of creating node data, and creating the node data by using the search tree is not restrictive. The creating the plurality pieces of node data based on the search tree includes the following steps.

Step A: Obtain each preset target prefix and outbound port information of each target prefix.

In step A, the target prefix is preset data. There may be a plurality of target prefixes, and each target prefix is corresponding one piece of outbound port information.

Step B: Create a search tree based on each target prefix, where each target prefix is corresponding to one node in the search tree.

There are many types of search trees. For example, a binary tree may be created based on each target prefix. For another example, a multiway tree may be created based on each target prefix. For another example, a path compression tree may be created based on each target prefix. Certainly, the search tree is not limited to the binary tree, the multiway tree, or the path compression tree in this embodiment of the present disclosure, and the search tree may be another type of search tree.

Step C: Divide the search tree into a plurality of levels, where each level of the search tree includes at least one subtree, and the subtree includes at least one node.

The search tree has a plurality of nodes. After the search tree is divided into a plurality of levels, there are a plurality of subtrees in the search tree, and each subtree includes at least one node.

There are a plurality of manners of dividing the search tree into a plurality of levels. For example, the search tree may be divided into a plurality of levels by using a plurality of methods such as based on a fixed step, a dynamic step, post-order traversal, or pre-order traversal, so that the search tree is evolved into a plurality of subtrees.

Step D: Determine a storage location corresponding to each subtree in the search tree and a storage location of a next-level subtree corresponding to each subtree.

Each subtree is corresponding to one piece of node data, and therefore each subtree needs to be pre-allocated to the storage location. Therefore, in step D, the storage location corresponding to each subtree and the storage location of the next-level subtree corresponding to each subtree may be determined based on a pre-allocation status.

Step E: Determine a target prefix and a next-level subtree that are corresponding to a prefix of each subtree in the search tree.

A search path of each subtree is the prefix of each subtree, and the prefix of each subtree may be corresponding to the target prefix or the next-level subtree. A prefix of each subtree is corresponding to only one target prefix or only one next-level subtree, and the prefix of each subtree cannot be corresponding to one target prefix and one next-level subtree.

Step F: Create node data of each subtree, where the node data is a correspondence among the prefix of each subtree, outbound port information of the target prefix, a storage address of the next-level subtree, and the storage location of the next-level subtree.

After the target prefix and the next-level subtree that are corresponding to the prefix of each subtree in the search tree are determined, the node data may be created based on the prefix of each subtree, the outbound port information of the target prefix, the storage address of the next-level subtree, and the storage location of the next-level subtree. There may be a correspondence between the prefix of each subtree and the outbound port information of the target prefix, and there may be a correspondence between the prefix of each subtree and both the storage address of the next-level subtree and the storage location of the next-level subtree. All data in a correspondence with the prefix of each subtree needs to be centralized to generate the node data. The finally generated node data is the structure shown in Table 3.

Step G: Store the node data of each subtree in the storage location corresponding to each subtree.

After the node data of each subtree is created, it is only necessary to store the node data in the corresponding storage location, so that route search can be performed by using node data stored in different storage locations in a subsequent step.

For example, it is assumed that the search tree has five subtrees: a subtree A1, a subtree B1, a subtree C1, a subtree D1, and a subtree E1. Next-level subtrees of the subtree A1 are the subtree B1 and the subtree C1, and next-level subtrees of the subtree B1 are the subtree D1 and the subtree E1. Node data of the subtree A1 is A2, node data of the subtree B1 is B2, node data of the subtree C1 is C2, node data of the subtree D1 is D2, and node data of the subtree E1 is E2. It is assumed that the node data A2 is allocated to a board X1, the node data B2 and the node data C2 are allocated to a board X2, the node data D2 is allocated to a board X3, and the node data E2 is allocated to a board X4.

Figure 10:
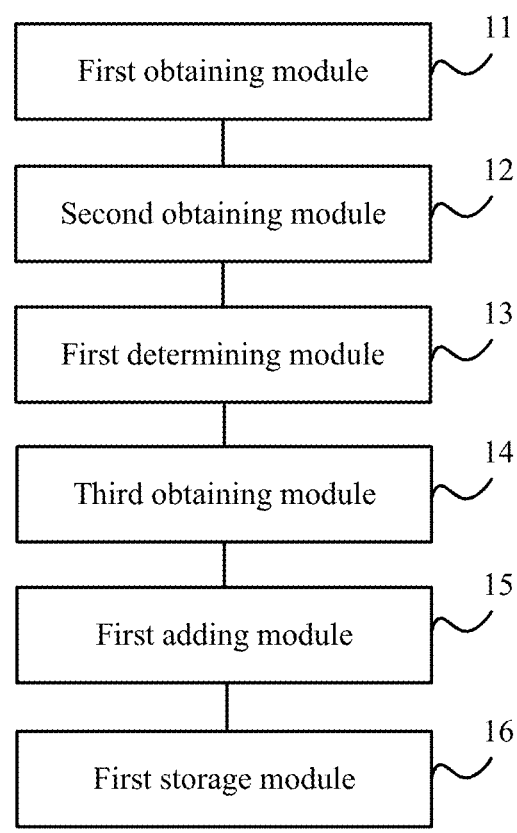
FIG. 10 is a schematic diagram of a route search apparatus according to an embodiment of the present disclosure.

FIG. 10 is a schematic diagram of a route search apparatus according to an embodiment of the present disclosure. FIG. 10 is an apparatus embodiment corresponding to FIG. 2. For content of FIG. 10 that is the same as that in FIG. 2, refer to FIG. 2. Referring to FIG. 10, the apparatus includes the following modules:

a first obtaining module 11, configured to obtain a keyword, where the keyword is obtained by translating an IP address in a packet;

a second obtaining module 12, configured to obtain node data based on a pre-obtained storage address of the node data, where the node data is a correspondence among a prefix, outbound port information of a target prefix, a storage address of next-level node data, and a storage location of the next-level node data;

a first determining module 13, configured to: determine, in the node data, a prefix matching a first part of the keyword, and determine, in the node data, data corresponding to the prefix, where the keyword includes the first part and a second part;

a third obtaining module 14, configured to: when the data is the storage address of the next-level node data and the storage location of the next-level node data, obtain a storage location of the node data;

a first adding module 15, configured to: when the storage location of the node data is different from the storage location of the next-level node data, add a pre-generated search identifier, the storage address of the next-level node data, and the second part of the keyword to a frame header of the packet, where the search identifier is used to indicate that the packet is a packet that needs to be used for subsequent search; and a first storage module 16, configured to send the packet having the frame header to a specified board corresponding to the storage location of the next-level node data.

Figure 11:
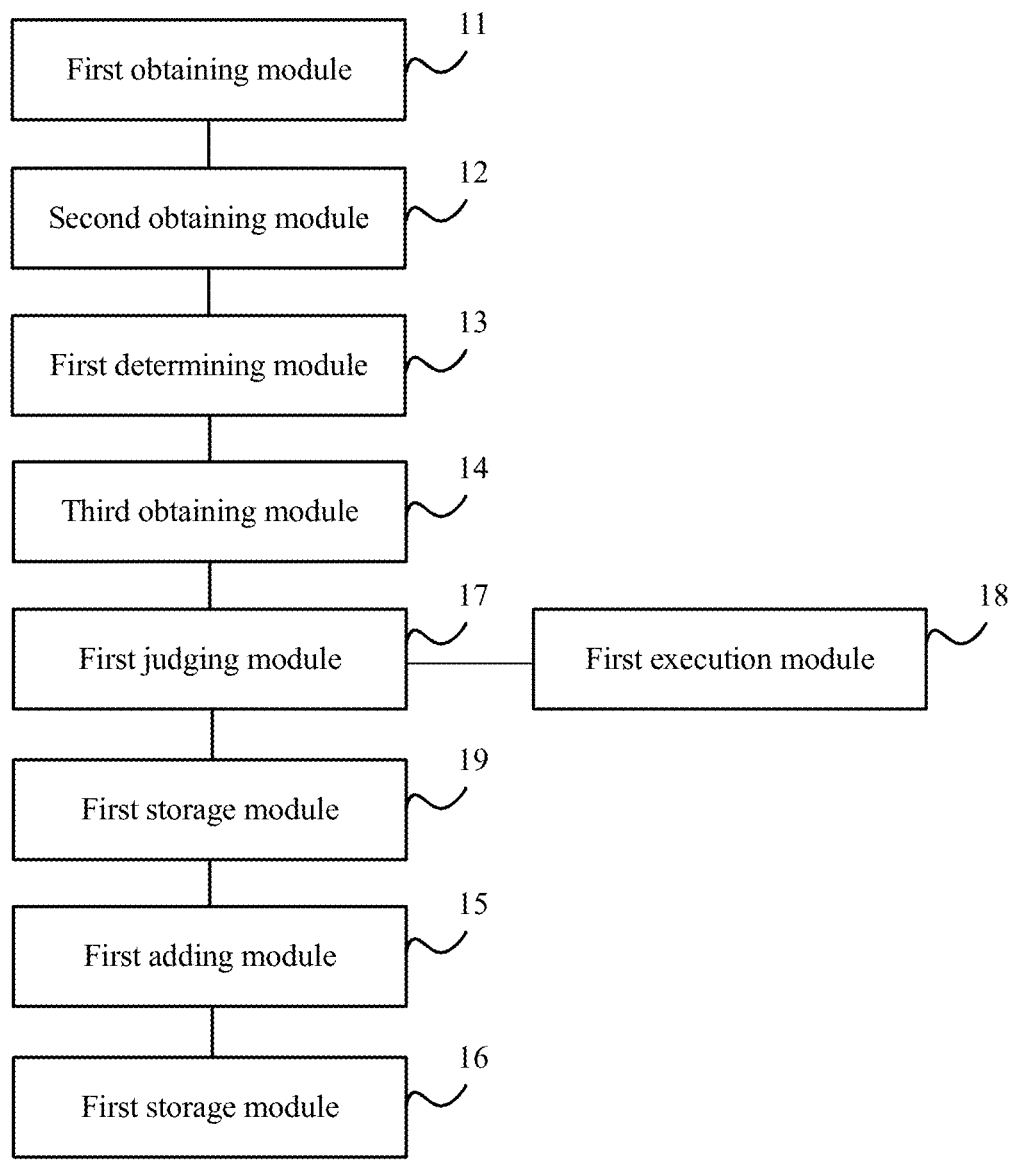
FIG. 11 is a schematic diagram of another route search apparatus according to an embodiment of the present disclosure.

FIG. 11 is a schematic diagram of another route search apparatus according to an embodiment of the present disclosure. FIG. 11 is an improved embodiment of FIG. 10. For content of FIG. 11 that is the same as that in FIG. 10, refer to FIG. 10. Referring to FIG. 11, the apparatus further includes the following modules:

a first judging module 17, configured to determine whether a storage location of node data is the same as a storage location of next-level node data;

a first execution module 18, configured to: when the storage location of the node data is the same as the storage location of the next-level node data, obtain the next-level node data based on a storage address of the next-level node data; determine, in the next-level node data, data corresponding to a second part of a keyword; and when the data is outbound port information of a target prefix, send a packet to a location corresponding to the outbound port information; and a second execution module 19, configured to: when the storage location of the node data is different from the storage location of the next-level node data, execute a first adding module 15.

Figure 12:
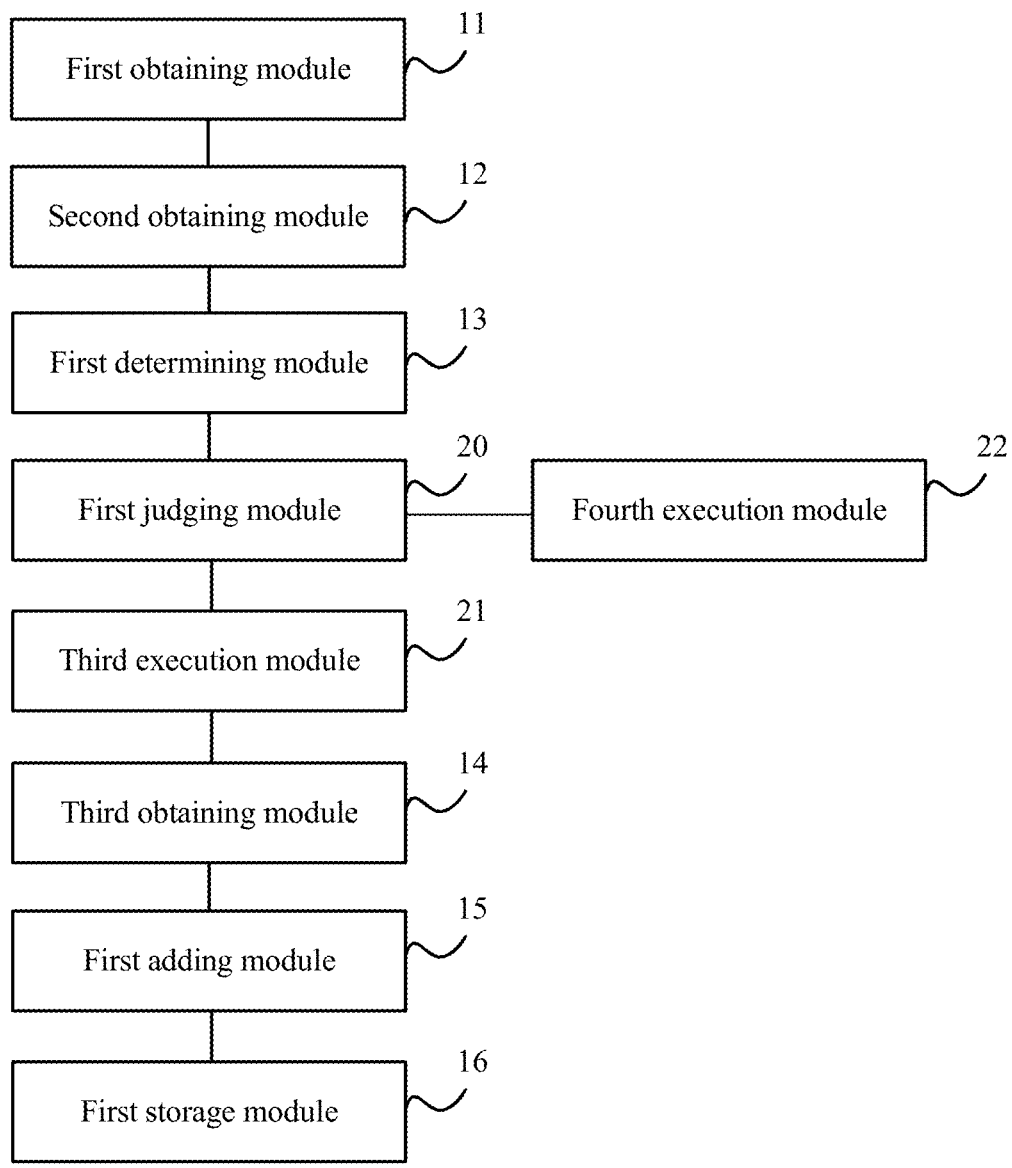
FIG. 12 is a schematic diagram of another route search apparatus according to an embodiment of the present disclosure.

FIG. 12 is a schematic diagram of another route search apparatus according to an embodiment of the present disclosure. FIG. 12 is an improved embodiment of FIG. 10. For content of FIG. 12 that is the same as that in FIG. 10, refer to FIG. 10. Referring to FIG. 12, the apparatus further includes the following modules:

a second judging module 20, configured to determine whether data is a storage address of next-level node data and a storage location of the next-level node data;

a third execution module 21, configured to: when the data is the storage address of the next-level node data and the storage location of the next-level node data, execute a third obtaining module 14; and a fourth execution module 22, configured to: when the data is not the storage address of the next-level node data and the storage location of the next-level node data, determine whether the data is outbound port information of a target prefix; and when the data is the outbound port information of the target prefix, send a packet to a location corresponding to the outbound port information.

Figure 13:
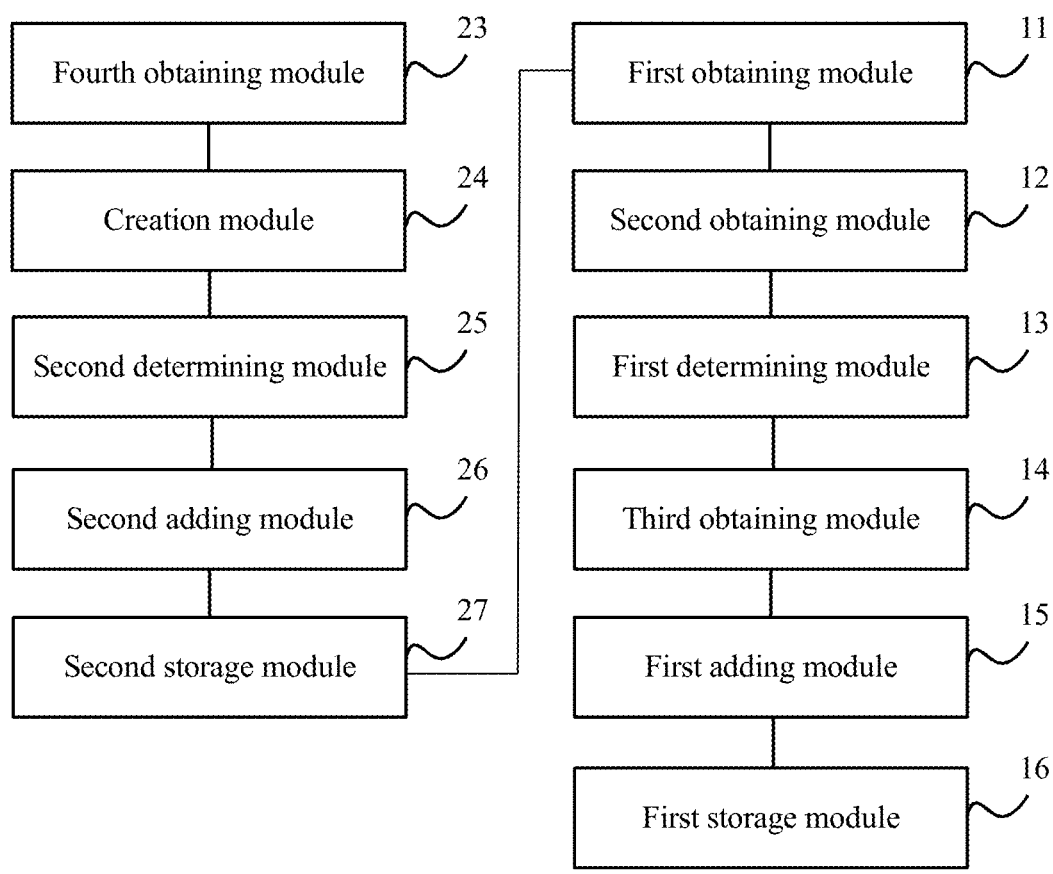
FIG. 13 is a schematic diagram of another route search apparatus according to an embodiment of the present disclosure.

FIG. 13 is a schematic diagram of another route search apparatus according to an embodiment of the present disclosure. FIG. 13 is an improved embodiment of FIG. 10. For content of FIG. 13 that is the same as that in FIG. 10, refer to FIG. 10. Referring to FIG. 13, the apparatus further includes the following modules:

a fourth obtaining module 23, configured to obtain each preset target prefix and outbound port information of each target prefix;

a creation module 24, configured to create a plurality pieces of node data based on each target prefix and the outbound port information of each target prefix, where the plurality pieces of node data are classified into at least two levels, and the node data has at least one prefix;

a second determining module 25, configured to determine a storage location of each of the plurality pieces of node data, a storage location of next-level node data of each piece of node data, and a storage address of the next-level node data of each piece of node data;

a second adding module 26, configured to add the storage location of the next-level node data of each piece of node data and the storage address of the next-level node data of each piece of node data to the plurality pieces of node data; and a second storage module 27, configured to store the plurality pieces of node data in the storage location corresponding to each piece of node data.

Figure 14:
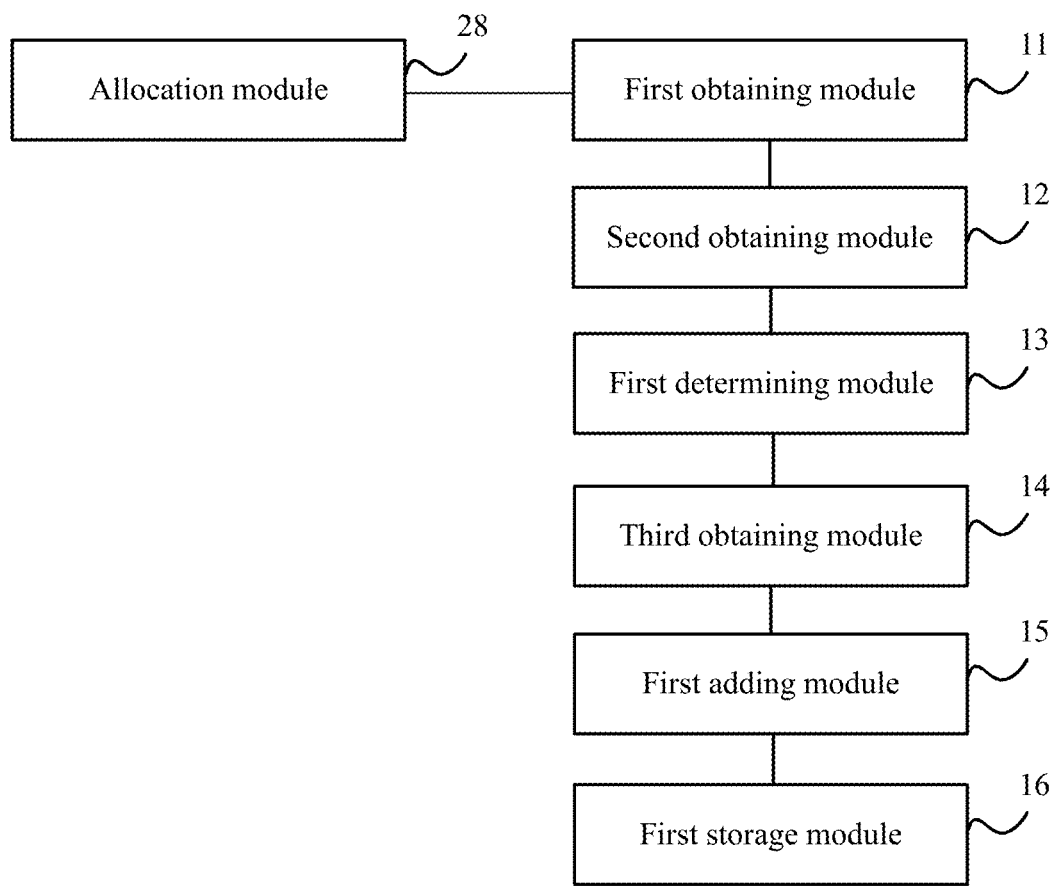
FIG. 14 is a schematic diagram of another route search apparatus according to an embodiment of the present disclosure.

FIG. 14 is a schematic diagram of another route search apparatus according to an embodiment of the present disclosure. FIG. 14 is an improved embodiment of FIG. 10. For content of FIG. 14 that is the same as that in FIG. 10, refer to FIG. 10. Referring to FIG. 14, the apparatus further includes the following module:

an allocation module 28, configured to allocate each piece of node data to each storage location according to a preset allocation policy, where each storage location is selected from a plurality of boards of a routing device.

Figure 15:
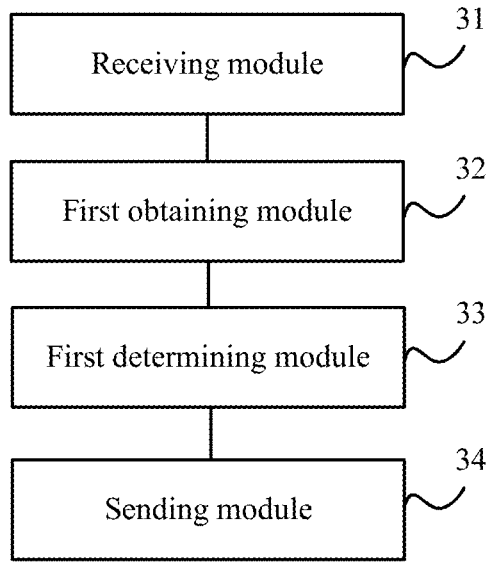
FIG. 15 is a schematic diagram of another route search apparatus according to an embodiment of the present disclosure.

FIG. 15 is a schematic diagram of another route search apparatus according to an embodiment of the present disclosure. FIG. 15 is an apparatus embodiment corresponding to FIG. 6. For content of FIG. 15 that is the same as that in FIG. 6, refer to FIG. 6. Referring to FIG. 15, the apparatus includes the following modules:

a receiving module 31, configured to receive a packet, having a frame header, sent by a target board, where the frame header includes a search identifier, a storage address of node data, and a keyword;

a first obtaining module 32, configured to: when the frame header includes the search identifier, obtain the node data based on the storage address of the node data in the frame header, where the node data is a correspondence among a prefix, outbound port information of a target prefix, a storage address of next-level node data, and a storage location of the next-level node data;

a first determining module 33, configured to determine, in the node data, data corresponding to the keyword; and a sending module 34, configured to: when the data is the outbound port information of the target prefix, send the packet to a location corresponding to the outbound port information.

Figure 16:
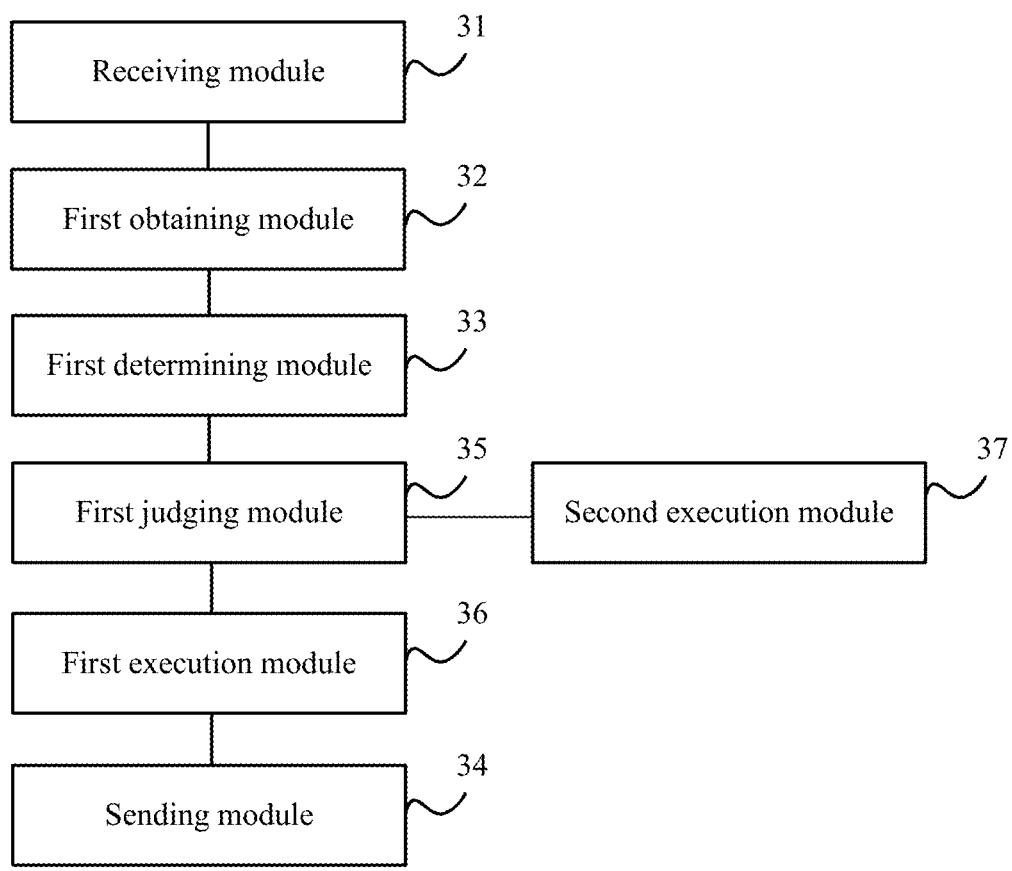
FIG. 16 is a schematic diagram of another route search apparatus according to an embodiment of the present disclosure.

FIG. 16 is a schematic diagram of another route search apparatus according to an embodiment of the present disclosure. FIG. 16 is an improved embodiment of FIG. 15. For content of FIG. 16 that is the same as that in FIG. 15, refer to FIG. 15. Referring to FIG. 16, the apparatus further includes the following modules:

a first judging module 35, configured to determine whether data is outbound port information of a target prefix;

a first execution module 36, configured to: when the data is the outbound port information of the target prefix, execute a sending module 34; and a second execution module 37, configured to: when the data is not the outbound port information of the target prefix, determine whether the data is a storage address of next-level node data and a storage location of the next-level node data; when the data is the storage address of the next-level node data and the storage location of the next-level node data, obtain a storage location of node data; and when the storage location of the node data is different from the storage location of the next-level node data, add a search identifier, the storage address of the next-level node data, and a remaining part of a keyword to a frame header of a packet, and send the packet having the frame header to the storage location of the next-level node data.

Figure 17:
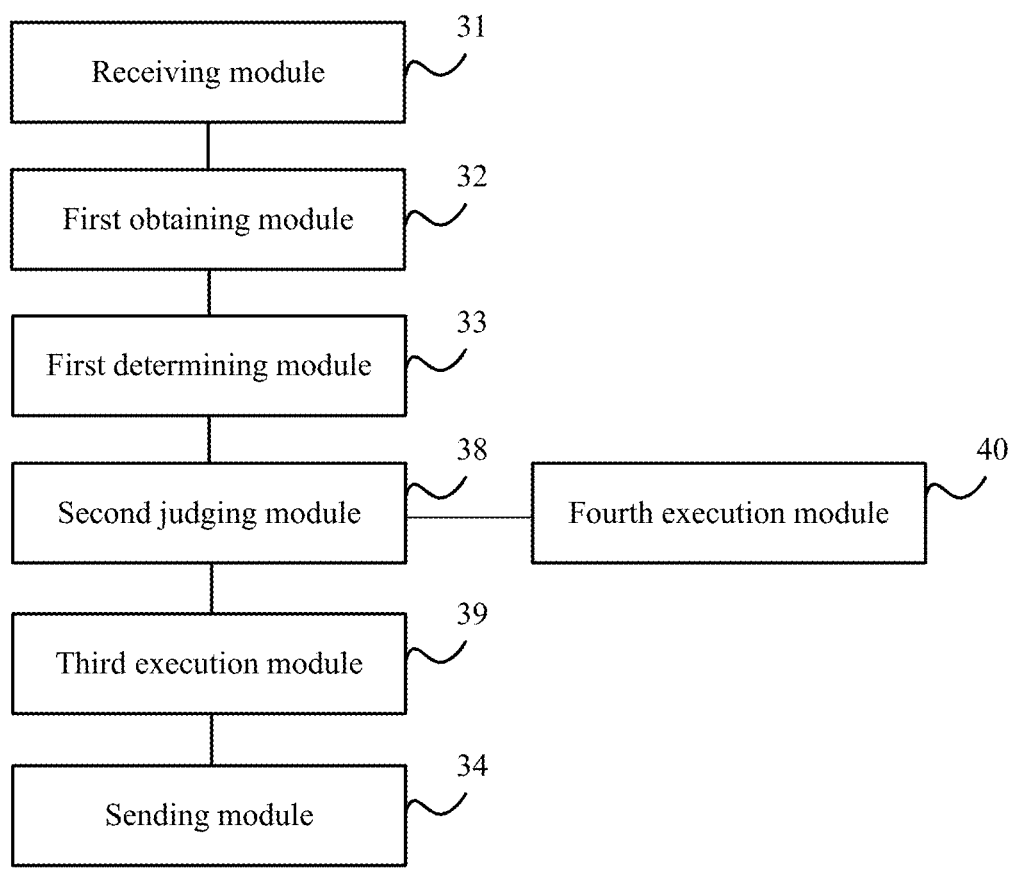
FIG. 17 is a schematic diagram of another route search apparatus according to an embodiment of the present disclosure.

FIG. 17 is a schematic diagram of another route search apparatus according to an embodiment of the present disclosure. FIG. 17 is an improved embodiment of FIG. 15. For content of FIG. 17 that is the same as that in FIG. 15, refer to FIG. 15. Referring to FIG. 17, the apparatus further includes the following modules:

a second judging module 38, configured to determine whether data is outbound port information of a target prefix;

a third execution module 39, configured to: when the data is the outbound port information of the target prefix, execute a sending module 34; and a fourth execution module 40, configured to: when the data is not the outbound port information of the target prefix, determine whether the data is a storage address of next-level node data and a storage location of the next-level node data; when the data is the storage address of the next-level node data and the storage location of the next-level node data, obtain a storage location of node data; when the storage location of the node data is the same as the storage location of the next-level node data, obtain the next-level node data based on the storage address of the next-level node data, and determine, in the next-level node data, data corresponding to a remaining part of a keyword; and when the data is the outbound port information of the target prefix, send a packet to a location corresponding to the outbound port information.

Figure 18:
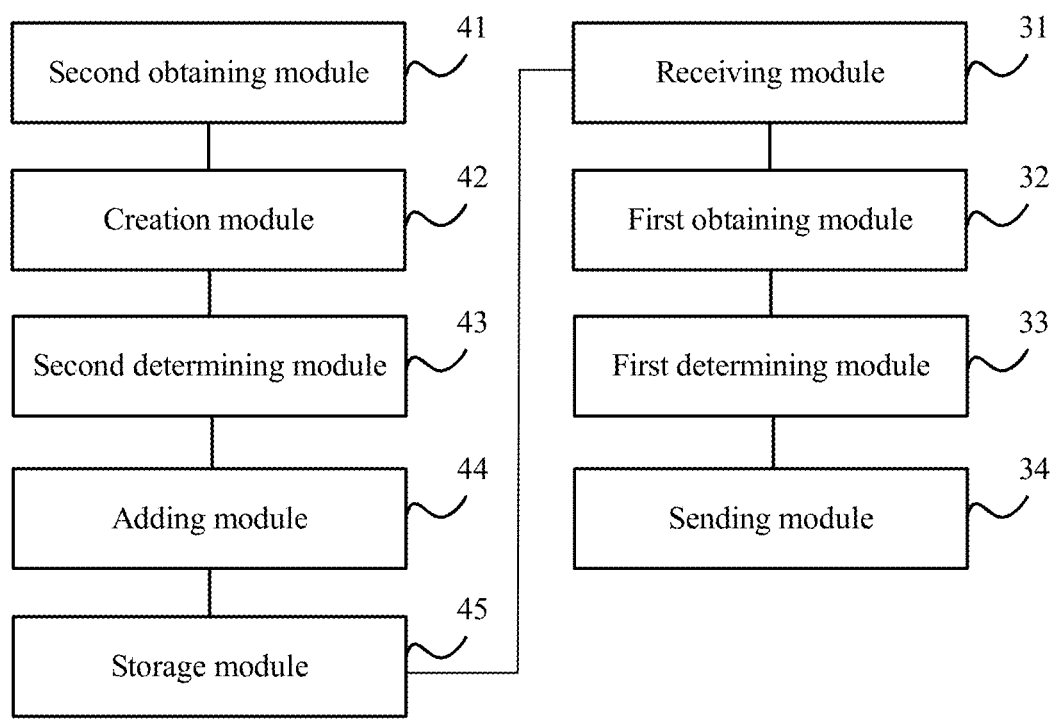
FIG. 18 is a schematic diagram of another route search apparatus according to an embodiment of the present disclosure.

FIG. 18 is a schematic diagram of another route search apparatus according to an embodiment of the present disclosure. FIG. 18 is an improved embodiment of FIG. 15. For content of FIG. 18 that is the same as that in FIG. 15, refer to FIG. 15. Referring to FIG. 18, the apparatus further includes the following modules:

a second obtaining module 41, configured to obtain each preset target prefix and outbound port information of each target prefix;

a creation module 42, configured to create a plurality pieces of node data based on each target prefix and the outbound port information of each target prefix, where the plurality pieces of node data are classified into at least two levels, and the node data has at least one prefix;

a second determining module 43, configured to determine a storage location of each of the plurality pieces of node data, a storage location of next-level node data of each piece of node data, and a storage address of the next-level node data of each piece of node data;

an adding module 44, configured to add the storage location of the next-level node data of each piece of node data and the storage address of the next-level node data of each piece of node data to the plurality pieces of node data; and a storage module 45, configured to store the plurality pieces of node data in the storage location corresponding to each piece of node data.

Figure 19:
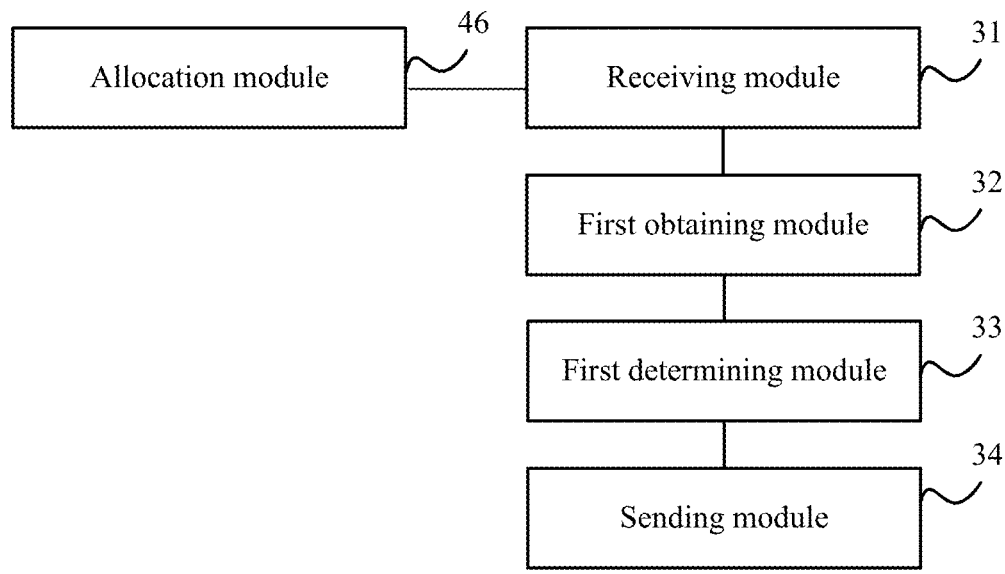
FIG. 19 is a schematic diagram of another route search apparatus according to an embodiment of the present disclosure.

FIG. 19 is a schematic diagram of another route search apparatus according to an embodiment of the present disclosure. FIG. 19 is an improved embodiment of FIG. 15. For content of FIG. 19 that is the same as that in FIG. 15, refer to FIG. 15. Referring to FIG. 19, the apparatus further includes the following module:

an allocation module 46, configured to allocate each piece of node data to each storage location according to a preset allocation policy, where each storage location is selected from a plurality of boards of a routing device.

Figure 20:
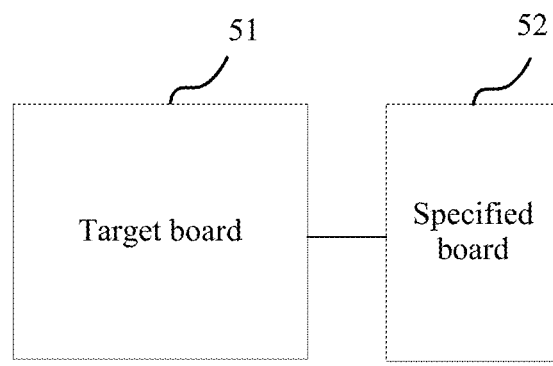
FIG. 20 is a schematic diagram of a routing device according to an embodiment of the present disclosure.

FIG. 20 is a schematic diagram of a routing device according to an embodiment of the present disclosure. Referring to FIG. 20, the routing device includes a target board 51 and a specified board 52.

The target board 51 is configured to: obtain a keyword, where the keyword is obtained by translating an IP address in a packet; obtain node data based on a pre-obtained storage address of the node data, where the node data is a correspondence among a prefix, outbound port information of a target prefix, a storage address of next-level node data, and a storage location of the next-level node data; determine, in the node data, a prefix matching a first part of the keyword, and determine, in the node data, data corresponding to the prefix, where the keyword includes the first part and a second part; when the data is the storage address of the next-level node data and the storage location of the next-level node data, obtain a storage location of the node data; when the storage location of the node data is different from the storage location of the next-level node data, add a pre-generated search identifier, the storage address of the next-level node data, and the second part of the keyword to a frame header of the packet, where the search identifier is used to indicate that the packet is a packet that needs to be used for subsequent search; and send the packet having the frame header to a specified board corresponding to the storage location of the next-level node data.

The specified board 52 is configured to: receive the packet, having the frame header, sent by the target board, where the frame header includes the search identifier, the storage address of the next-level node data, and the second part of the keyword; when the frame header includes the search identifier, obtain the next-level node data based on the storage address of the next-level node data in the frame header; determine, in the next-level node data, data corresponding to the second part of the keyword; and when the data corresponding to the second part of the keyword is the outbound port information of the target prefix, send the packet to a location corresponding to the outbound port information.

In the embodiment shown in FIG. 20, the target board 51 and the specified board 52 may be line cards, switching boards, or other boards.

Figure 21:
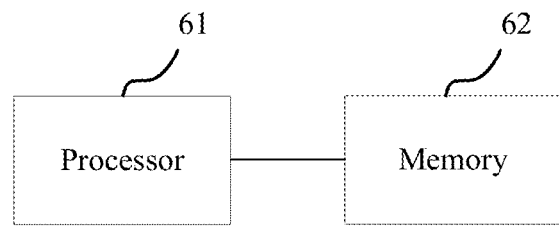
FIG. 21 is a schematic diagram of another routing device according to an embodiment of the present disclosure.

FIG. 21 is a schematic diagram of another routing device according to an embodiment of the present disclosure. Referring to FIG. 21, the routing device includes a processor 61 and a memory 62. The memory 62 stores an operation instruction executable by the processor 61, and the processor 61 reads the operation instruction from the memory 62 to implement the following methods:

obtaining a keyword, where the keyword is obtained by translating an IP address in a packet; obtaining node data based on a pre-obtained storage address of the node data, where the node data is a correspondence among a prefix, outbound port information of a target prefix, a storage address of next-level node data, and a storage location of the next-level node data; determining, in the node data, a prefix matching a first part of the keyword, and determining, in the node data, data corresponding to the prefix, where the keyword includes the first part and a second part; when the data is the storage address of the next-level node data and the storage location of the next-level node data, obtaining a storage location of the node data; when the storage location of the node data is different from the storage location of the next-level node data, adding a pre-generated search identifier, the storage address of the next-level node data, and the second part of the keyword to a frame header of the packet, where the search identifier is used to indicate that the packet is a packet that needs to be used for subsequent search; sending the packet having the frame header to a specified board corresponding to the storage location of the next-level node data; receiving the packet, having the frame header, sent by a target board, where the frame header includes the search identifier, the storage address of the next-level node data, and the second part of the keyword; when the frame header includes the search identifier, obtaining the next-level node data based on the storage address of the next-level node data in the frame header; determining, in the next-level node data, data corresponding to the second part of the keyword; and when the data corresponding to the second part of the keyword is the outbound port information of the target prefix, sending the packet to a location corresponding to the outbound port information.

It should be noted that the embodiments shown in FIG. 1 to FIG. 21 are merely optional embodiments described in the present disclosure. Based on this, a person skilled in the art can design more embodiments, and details are not described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not be performed. In addition, the displayed or discussed mutual couplings or direct couplings or communication connections may be implemented in indirect couplings or communication connections through some interfaces, apparatuses, or units, and may be in electrical, mechanical, or other forms.

The units described as separate parts may or may not be physically separate, and parts displayed as units may or may not be physical units, may be located in one position, or may be distributed to a plurality of network units. Some or all of the units may be selected depending on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium and includes several instructions for instructing a computer device (which may be a personal computer, a server, a network device, or the like) or a processor (processor) to perform all or a part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A route search method applied to a target board of a routing device, the method comprising:
 obtaining a keyword by translating an IP address in a packet;
 obtaining node data based on a pre-obtained storage address of the node data, wherein the node data indicates a correspondence among a prefix, outbound port information of a target prefix, a storage address of next-level node data, and a storage location of the next-level node data;
 determining, in the node data, a prefix matching a first part of the keyword, and determining, in the node data, data corresponding to the prefix, wherein the keyword comprises the first part and a second part;
 when the data is the storage address of the next-level node data and the storage location of the next-level node data, obtaining a storage location of the node data;

when the storage location of the node data is different from the storage location of the next-level node data, adding (1) a pre-generated search identifier, (2) the storage address of the next-level node data, and (3) the second part of the keyword to a frame header of the packet, wherein the pre-generated search identifier indicates that the packet is a packet that needs to be used for subsequent search; and sending the packet having the frame header to a specified board corresponding to the storage location of the next-level node data.

2. The route search method according to claim 1, wherein after obtaining the storage location of the node data, the method further comprises:

determining whether the storage location of the node data is the same as the storage location of the next-level node data;

when the storage location of the node data is the same as the storage location of the next-level node data, obtaining the next-level node data based on the storage address of the next-level node data, determining, in the next-level node data, data corresponding to the second part of the keyword, and when the data is the outbound port information of the target prefix, sending the packet to a location corresponding to the outbound port information; and when the storage location of the node data is different from the storage location of the next-level node data, adding (1) a search identifier, (2) the storage address of the next-level node data, and (3) the second part of the keyword to the frame header of the packet.

3. The route search method according to claim 1, wherein after determining, in the node data, a prefix matching the keyword, and determining, in the node data, data corresponding to the prefix, the method further comprises:

determining whether the data is the storage address of the next-level node data and the storage location of the next-level node data;

when the data is the storage address of the next-level node data and the storage location of the next-level node data, obtaining the storage location of the node data; and when the data is not the storage address of the next-level node data and the storage location of the next-level node data, determining whether the data is the outbound port information of the target prefix, and when the data is the outbound port information of the target prefix, sending the packet to a location corresponding to the outbound port information.

4. The route search method according to claim 1, wherein before obtaining a keyword, the method further comprises:

obtaining each preset target prefix and outbound port information of each target prefix;

creating a plurality pieces of node data based on each target prefix and the outbound port information of each target prefix, wherein the plurality pieces of node data are classified into at least two levels, and the node data has at least one prefix;

determining a storage location of each of the plurality pieces of node data, a storage location of next-level node data of each piece of node data, and a storage address of the next-level node data of each piece of node data;

adding the storage location of the next-level node data of each piece of node data and the storage address of the next-level node data of each piece of node data to the plurality pieces of node data; and storing the plurality pieces of node data in the storage location corresponding to each piece of node data.

5. The route search method according to claim 1, wherein before obtaining node data based on a pre-obtained storage address of the node data, the method further comprises:

allocating each piece of node data to each storage location according to a preset allocation policy, wherein each storage location is selected from a plurality of boards of the routing device.

6. A route search method applied to a specified board of a routing device, the method comprising:

receiving a packet having a frame header and sent by a target board, wherein the frame header comprises a search identifier, a storage address of node data, and a keyword;

when the frame header comprises the search identifier, obtaining the node data based on the storage address of the node data in the frame header, wherein the node data a correspondence among a prefix, outbound port information of a target prefix, a storage address of next-level node data, and a storage location of the next-level node data;

determining, in the node data, data corresponding to the keyword; and when the data is the outbound port information of the target prefix, sending the packet to a location corresponding to the outbound port information.

7. The route search method according to claim 6, wherein after determining, in the node data, data corresponding to the keyword, the method further comprises:

determining whether the data is the outbound port information of the target prefix;

when the data is the outbound port information of the target prefix, sending the packet to a location corresponding to the outbound port information; and when the data is not the outbound port information of the target prefix, determining whether the data is the storage address of the next-level node data and the storage location of the next-level node data, when the data is the storage address of the next-level node data and the storage location of the next-level node data, obtaining a storage location of the node data, and when the storage location of the node data is different from the storage location of the next-level node data, adding (1) the search identifier, (2) the storage address of the next-level node data and (3) a remaining part of the keyword to the frame header of the packet, and sending the packet having the frame header to the storage location of the next-level node data.

8. The route search method according to claim 6, wherein after determining, in the node data, data corresponding to the keyword, the method further comprises:

determining whether the data is the outbound port information of the target prefix;

when the data is the outbound port information of the target prefix, sending the packet to a location corresponding to the outbound port information; and when the data is not the outbound port information of the target prefix, determining whether the data is the storage address of the next-level node data and the storage location of the next-level node data, when the data is the storage address of the next-level node data and the storage location of the next-level node data, obtaining a storage location of the node data, and when the storage location of the node data is the same as the storage location of the next-level node data, obtaining the next-level node data based on the storage address of the next-level node data, and determining, in the next-level node data, data corresponding to a remaining part of the keyword.

9. The route search method according to claim 6, wherein before receiving a packet having a frame header and sent by a target board, the method further comprises:
obtaining each preset target prefix and outbound port information of each target prefix;
creating a plurality pieces of node data based on each target prefix and the outbound port information of each target prefix, wherein the plurality pieces of node data are classified into at least two levels, and the node data has at least one prefix;
determining a storage location of each of the plurality pieces of node data, a storage location of next-level node data of each piece of node data, and a storage address of the next-level node data of each piece of node data;
adding the storage location of the next-level node data of each piece of node data and the storage address of the next-level node data of each piece of node data to the plurality pieces of node data; and
storing the plurality pieces of node data in the storage location corresponding to each piece of node data.

10. The route search method according to claim 6, wherein before receiving a packet having a frame header and sent by a target board, the method further comprises:
allocating each piece of node data to each storage location according to a preset allocation policy, wherein each storage location is selected from a plurality of boards of the routing device.

11. A route search apparatus, comprising:
memory; and
a processor configured to:
obtain a keyword, wherein the keyword is obtained by translating an IP address in a packet,
obtain node data based on a pre-obtained storage address of the node data, wherein the node data indicates a correspondence among a prefix, outbound port information of a target prefix, a storage address of next-level node data, and a storage location of the next-level node data,
determine, in the node data, a prefix matching a first part of the keyword, and determine, in the node data, data corresponding to the prefix, wherein the keyword comprises the first part and a second part,
when the data is the storage address of the next-level node data and the storage location of the next-level node data, obtain a storage location of the node data,
when the storage location of the node data is different from the storage location of the next-level node data, add (1) a pre-generated search identifier, (2) the storage address of the next-level node data, and (3) the second part of the keyword to a frame header of the packet, wherein the pre-generated search identifier indicates that the packet is a packet that needs to be used for subsequent search, and
send the packet having the frame header to a specified board corresponding to the storage location of the next-level node data.

12. The route search apparatus according to claim 11, wherein the processor is further configured to:
determine whether the storage location of the node data is the same as the storage location of the next-level node data;
when the storage location of the node data is the same as the storage location of the next-level node data, obtain the next-level node data based on the storage address of the next-level node data, determine, in the next-level node data, data corresponding to the second part of the keyword, and when the data is the outbound port information of the target prefix, send the packet to a location corresponding to the outbound port information; and
when the storage location of the node data is different from the storage location of the next-level node data, (1) add a search identifier, (2) the storage address of the next-level node data, and (3) the second part of the keyword to the frame header of the packet.

13. The route search apparatus according to claim 11, wherein the processor is further configured to:
determine whether the data is the storage address of the next-level node data and the storage location of the next-level node data;
when the data is the storage address of the next-level node data and the storage location of the next-level node data, obtain the storage location of the node data; and
when the data is not the storage address of the next-level node data and the storage location of the next-level node data, determine whether the data is the outbound port information of the target prefix, and when the data is the outbound port information of the target prefix, send the packet to a location corresponding to the outbound port information.

14. The route search apparatus according to claim 11, wherein the processor is further configured to:
obtain each preset target prefix and outbound port information of each target prefix;
create a plurality pieces of node data based on each target prefix and the outbound port information of each target prefix, wherein the plurality pieces of node data are classified into at least two levels, and the node data has at least one prefix;
determine a storage location of each of the plurality pieces of node data, a storage location of next-level node data of each piece of node data, and a storage address of the next-level node data of each piece of node data;
add the storage location of the next-level node data of each piece of node data and the storage address of the next-level node data of each piece of node data to the plurality pieces of node data; and
store the plurality pieces of node data in the storage location corresponding to each piece of node data.

15. The route search apparatus according to claim 11, wherein the apparatus further comprises:
an allocation module, configured to allocate each piece of node data to each storage location according to a preset allocation policy, wherein each storage location is selected from a plurality of boards of the routing device.

* * * * *